(12) United States Patent
Mott

(10) Patent No.: US 10,645,087 B2
(45) Date of Patent: May 5, 2020

(54) CENTRALIZED AUTHENTICATING ABSTRACTION LAYER WITH ADAPTIVE ASSEMBLY LINE PATHWAYS

(71) Applicant: AMGEN INC., Thousand Oaks, CA (US)

(72) Inventor: Spencer Mott, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 63 days.

(21) Appl. No.: 15/615,305

(22) Filed: Jun. 6, 2017

(65) Prior Publication Data

US 2018/0351957 A1 Dec. 6, 2018

(51) Int. Cl.
*H04L 29/06* (2006.01)
*G06F 16/2452* (2019.01)
*G06F 21/62* (2013.01)
*G06F 21/31* (2013.01)
*H04L 29/08* (2006.01)

(52) U.S. Cl.
CPC ........ *H04L 63/102* (2013.01); *G06F 16/2452* (2019.01); *G06F 21/6245* (2013.01); *H04L 63/08* (2013.01); *H04L 63/101* (2013.01); *H04L 63/20* (2013.01); *G06F 21/31* (2013.01); *H04L 67/141* (2013.01)

(58) Field of Classification Search
CPC ..... H04L 63/102; H04L 63/101; H04L 63/20; H04L 63/08; H04L 67/141; G06F 16/2452; G06F 21/6245; G06F 21/31
See application file for complete search history.

(56) References Cited

U.S. PATENT DOCUMENTS

| | | | | |
|---|---|---|---|---|
| 8,613,070 B1 * | 12/2013 | Borzycki | ............ | G06F 21/6218 726/8 |
| 9,009,858 B2 * | 4/2015 | Sapp, II | .............. | G06F 21/6218 726/30 |
| 9,197,670 B2 * | 11/2015 | Kwok | ..................... | H04L 63/20 |

(Continued)

OTHER PUBLICATIONS

International Search Report and Written Opinion from PCT/US2018/036225 dated Aug. 22, 2018.

(Continued)

*Primary Examiner* — J. Brant Murphy
(74) *Attorney, Agent, or Firm* — Marshall, Gerstein & Borun LLP

(57) ABSTRACT

Systems and methods for cloud based computing systems and, more particularly, techniques for providing centralized user access to network connected computing systems are disclosed. A method for handling access commands originating from at least one source application utilizing a first format, to at least one destination application utilizing a second format is disclosed. The method comprises receiving an access command from a user using at least one source application, and determining a type for the access command based on a data payload. Generating an action based on the type for the access command and the data payload, and translating the data payload into a common format, wherein the common format is determined using the first format and the second format. Lastly, responding to the access command using the translated data payload and action, wherein the response addresses the request for user access to the network connected computing systems.

28 Claims, 15 Drawing Sheets

(56) References Cited

U.S. PATENT DOCUMENTS

| | | | |
|---|---|---|---|
| 10,360,997 B2* | 7/2019 | Connely, IV | G16H 10/60 |
| 10,423,626 B2* | 9/2019 | Stearn | G06F 16/2452 |
| 2005/0080791 A1* | 4/2005 | Ghatare | G06F 16/24522 |
| 2011/0138370 A1* | 6/2011 | Albert | G06F 9/541 |
| | | | 717/136 |
| 2012/0185913 A1* | 7/2012 | Martinez | G06F 9/455 |
| | | | 726/1 |
| 2013/0014278 A1* | 1/2013 | Jin | G06F 19/00 |
| | | | 726/28 |
| 2013/0232266 A1* | 9/2013 | Lowry | G06F 7/00 |
| | | | 709/225 |
| 2015/0237041 A1* | 8/2015 | Flamini | H04L 63/0807 |
| | | | 726/10 |
| 2015/0271271 A1* | 9/2015 | Bullotta | H04L 67/141 |
| | | | 709/228 |
| 2015/0326562 A1* | 11/2015 | Belote | G06F 21/41 |
| | | | 726/4 |
| 2016/0057050 A1* | 2/2016 | Ostrom | H04L 45/00 |
| | | | 370/392 |
| 2016/0080360 A1* | 3/2016 | Child | H04L 63/0815 |
| | | | 726/6 |
| 2016/0080369 A1* | 3/2016 | Potash | H04L 63/08 |
| | | | 726/5 |
| 2016/0239582 A1* | 8/2016 | Schechter | G06F 16/2452 |
| 2017/0109399 A1* | 4/2017 | Stearn | G06N 5/04 |
| 2018/0121612 A1* | 5/2018 | Connely, IV | G06F 16/27 |

OTHER PUBLICATIONS

International Preliminary Report on Patentability from International Application No. PCT/US2018/036225 dated Dec. 19, 2019.
"IdentityNow. Comprehensive Cloud-based Identity Goverance", SailPoint Technologies, Inc. (2017). Found at link <https://docs.sailpoint.com/pdf/?file=https://docs.sailpoint.com/wp-content/uploads/SailPoint-IdentityNow-Brochure.pdf>.
"SecurityIQ Complete Access Goverance for Unstructed Data", SailPoint Technologies, Inc. (2016). Found at link <https://www.itconcepts.ch/assets/it-security/data-access-governance/SailPoint-SecurityIQ-Brochure.pdf>.
"Extending Identity Goverance to Highly Privileged Accounts", SailPoint Technologies, Inc. (2017). Found at link <https://docs.sailpoint.com/pdf/?file=https://docs.sailpoint.com/wp-content/uploads/SailPoint-IdentityIQ-PAM-Module.pdf>.
"IBM Security Identity Manager", Quick Start Guide (2017). Found at link <https://www.ibm.com/support/knowledgecenter/en/SSRMWJ_7.0.1/com.ibm.isim.doc/isim70_QuiQuickSt_Guide.htm>.

* cited by examiner

CENTRALIZED AUTHENTICATING ABSTRACTION LAYER WITH ADAPTIVE ASSEMBLY LINE PATHWAYS

FIELD OF THE DISCLOSURE

The present disclosure relates generally to techniques for cloud based computing systems and, more particularly, to techniques for providing centralized user access to network connected computing systems.

BACKGROUND

The background description provided herein is for the purpose of generally presenting the context of the disclosure. Work of the presently named inventor, to the extent it is described in this background section or elsewhere herein, as well as aspects of the description that may not otherwise qualify as prior art at the time of filing, are neither expressly nor impliedly admitted as prior art against the present disclosure.

Access to medical information systems is carefully monitored and stringently regulated. In the healthcare field, access to patient information and other stored data is limited to those users with authorized access. And that authorization often involves stringent screening processes, processes that are manually implemented and time consuming. Moreover, when access is needed to different healthcare systems, differences in system architecture and design present particular challenges to the authentication process.

While these problems are particularly apparent in the healthcare field, many organizations and enterprises face technical challenges in managing user access to information and computer applications. The information often contains private, secured data. The information often contains complex and unrelated data. For example, the information collected and stored on a particular patient may be voluminous, rendering it impractical to grant a healthcare professional access to all of the patient's information.

Further, those who have access to information may only need access to certain types of information and no other types of information. The same is true for access to computer applications, as well of course. In healthcare field, for example, a point of care professional may need access to certain medical information through certain software applications, while a hospital administrator may only need access to certain other medical information through other software applications. The result is role-specific information access.

Unfortunately, given the fragmented nature of information systems and computer applications, authenticating and provisioning the right information to the right user is exceedingly difficult. Single Sign-On (SSO) cloud based systems have been developed, and with varying degrees of success. SSO and similar systems purport to offer true single points of user login, where a user can log into and access multiple different independent software systems. A user logs in with a single identification (ID) and password, without needing to use different usernames or passwords. In some instances, the same single authentication credentials are used for each targeting application. In other instances, the single authentication results in a token passed to each target application that manages their access.

There is still, unfortunately, a lack of consistent operation in these SSO cloud based systems. Furthermore, they lack decisional control over access grants and are agnostic to current security conditions and system loads, which can slowdown the authentication process and network operations. For organizations and enterprises, with thousands of users being on-boarded and off-boarded, the limitations become paramount.

SUMMARY OF THE INVENTION

In accordance with an example, a method is disclosed for handling access commands originating from at least one source application utilizing a first format, to at least one destination application utilizing a second format. The method comprises receiving an access command from a user using the at least one source application, wherein the access command includes a data payload structured according to the first format, and the at least one destination application for the data payload. Determining a type for the access command based on the data payload. Generating an action based on the type for the access command and the data payload. Translating the data payload into a common format, wherein the common format is determined using the first format and the second format, and comprises identifying information on the user, the at least one source application, and the at least one destination application. Responding to the access command using the action and translated data payload.

In accordance with an example, a non-transitory computer readable medium, which stores non-transitory computer executable instructions for handling access commands originating from at least one source application utilizing a first format, to at least one destination application utilizing a second format. The computer executable instructions include receiving an access command from a user using the at least one source application, wherein the access command includes a data payload structured according to the first format, and the at least one destination application for the data payload. Determining a type for the access command based on the data payload, and generating an action based on the type for the access command and the data payload. Translating the data payload into a common format, wherein the common format is determined using the first format and the second format. Responding to the access command using the action and the translated data payload.

In accordance with another example, a system for handling access commands originating from at least one source application utilizing a first format, to at least one destination application utilizing a second format, the system comprising: a user interface configured to communicate with a user; a memory configured to store non-transitory computer executable instructions, and a processor. The processor may be configured to interface with the memory and the user interface, wherein the processor is configured to execute the non-transitory computer executable instructions to cause the processor to receive an access command from the user using the at least one source application, wherein the access command includes a data payload structured according to the first format, and the at least one destination application for the data payload; determine a type for the access command based on the data payload; generate an action based on the type for the access command and the data payload; translate the data payload into a common format, wherein the common format is determined using the first format and the second format; and respond to the access command using the action and the translated data payload.

BRIEF DESCRIPTION OF THE DRAWINGS

The figures described below depict various aspects of the system and methods disclosed herein. It should be understood that each figure depicts an example of aspects of the present systems and methods.

DETAILED DESCRIPTION

Figure 1:
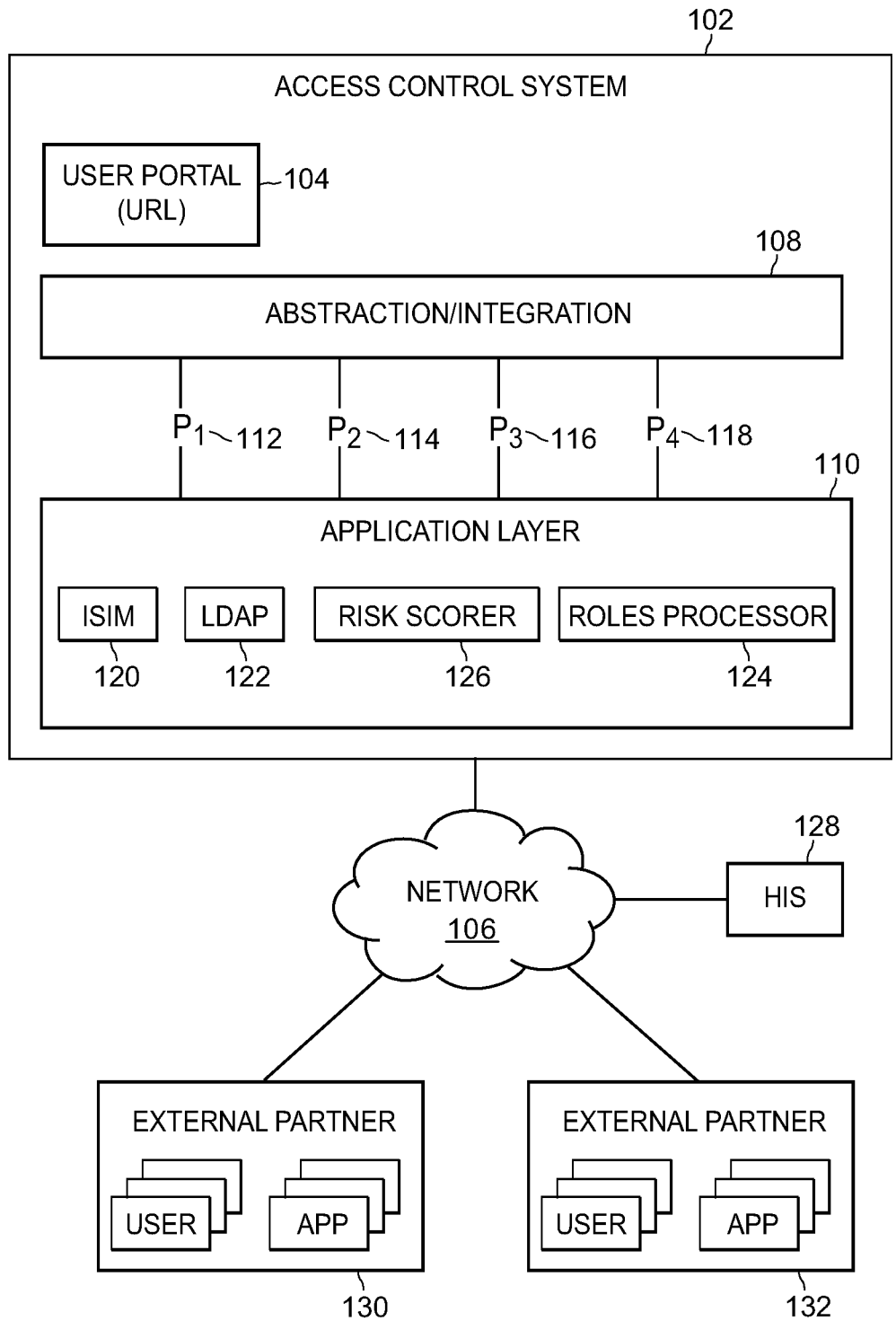
FIG. 1 illustrates a network-based computer architecture showing an access control system and a plurality of external partner computer systems, in accordance with an example.

The present techniques provide a network-based, automated user access provisioning system servicing multiple users, across multiple locations, and controlling user access to computer programs and information across dedicated computer systems. The systems and methods disclosed may be used for identity management, access and resource management, onboarding new users to a system, and offboarding existing users. Resources may be provisioned or de-provisioned to users as needed. Additionally, the systems and methods may provide an environment by which users can keep track of job requirements, for example training requirements, which correlate to a user's access to resources.

In some example embodiments, the user may interact with the systems and methods via a front-end system, via a graphical user interface, to submit requests for access to resources on the system. These requests may be access commands requesting access to various resources. The front-end system may be thought of as a computer-implemented source application for resolving user requests for computer resource access. Conversely, a backend system may be thought of a computer-implemented destination application for completing requests after they have been processed. As part of the request the user's identity may be verified by the computer system, and a determination may be made as to whether the user is allowed access to whatever resource the user is requesting. A variety of different methods to determine if a user's request should be granted may be employed, such as dynamic identity scoring based on an allocation of computer resources, access and privileges set by the user's employer, access and privileges determined by the user's membership in a predefined group, or the determination may be dependent on the type of request and what is being requested.

As stated above, the user may use the front end system to submit requests that use particular formats for each type of user request. Similarly, the backend systems that manage access to resources the user is attempting to access may be a system that utilizes a different type of format for processing each received request. These two systems, front end and backend, are unable to communicate with each other without some sort of translation of the messages they may send to each other. The disclosed systems and methods handle the process that translates requests from the front end system into a format that a backend system may handle.

As such, the disclosed systems and methods may act as a broker between the front end system and backend system that ensures that requests are sent to backend systems in a format understandable by the backend system. This format, which may be readable by the interface and the backend system, may be thought of as a common format. The common format may include any necessary information to process the command or request. The necessary information may include identifying information about the requestor, the application being used to make the request, and the destination application to handle the request. In some embodiments, the common format may be determined by utilizing an application programming interface that details how to interact with both front-end systems and backend resource systems. Similarly, in some embodiments the common format may be generated, in part, by utilizing a tailored lookup table consisting of entries for applications and a corresponding translation value for the application.

In some examples, a centralized abstraction/integration layer is developed and provided between front-end systems and backend systems to implement the common format. The centralized abstraction/integration layer may itself by format agnostic, i.e., able to resolve front-end system requests regardless of format and provision those requests to/from backend systems regardless of format. And such the centralized abstraction/integration layer is independent and decoupled from the front-end user interface and the backend resource system. Accordingly, the systems and methods disclosed process, handle, and transmit requests in an agnostic manner not reliant upon any one particular format for requests. The systems and methods function as a pass through that enables the front-end and backend systems to "talk" to each other. Additionally, because the systems and methods disclosed are decoupled from the front-end and backend systems they are able to interface with multiple systems at once.

In some embodiments, the systems and methods herein further manage user and manager requests to access privileges by determining a dynamic identity score associated with the request, that dynamic identity score is then used to determine user access privileges and to grant access requests.

The systems and methods can use the dynamic identity score to perform dynamic resource access requests in a number of ways. For example, user characteristics, such as user persona, or user group, may be used to determine user access, where the system provides users in different groups access to different resources. Additionally, the system, through the use of a centralized abstraction/integration layer communicating across different backend systems, may perform dynamic scoring using real time scoring of a user request and adapting access privileges based on the scoring. That real time scoring may be based on user profiled information, resulting in a "suggested access" recommendation from algorithm processes running on the system. That real time scoring can be based on a "model after" process in which user managers, system administrators, and the like, clone access from an existing user to a new user who has requested access to the system.

In some examples, the system performs dynamic scoring by further including network-specific or computer-specific characteristics, i.e., system characteristics, such as computer application profiled information, including current runtime statistics on a requested computer application, the current number of authorized users for the requested computer application, and a threshold level of users for the requested computer application. With large-scale systems having large number of users being onboarded and offboarded, often simultaneously, and with current users of computer resources fluctuating, at any given instant, by large amounts, the ability to have a centralized abstraction/integration layer managing access requests allows for this information to be managed efficiently and accurately to ensure not only optimal user experiences but to dramatically improve computer and network resources, an in particular resources of both front-end and backend systems, which are often themselves separate, dedicated network connected systems.

Further still, as explained, the dynamic scoring may further grant access based on user type (employee, manager, administrator, etc.). Moreover, dynamic scoring is performed in runtime and can be used to produce automated suggested access for users, where the suggested access rights include rights within an organization and rights from external partners external, separate from the organization. The dynamic scoring may include a threshold level, wherein if a score is above or below the threshold level then the system or method takes a particular action such as granting or denying the request.

The disclosed systems and methods may operate in a cloud computing environment leveraging distributed computing resources to handle the tasks and requests associated with the system. As a cloud computing solution the disclosed systems and methods may allow for users to access the systems and methods anywhere the user has Internet access. This allows users, and organizations, to utilize the disclosed systems and methods in a variety of environments and through a variety of different devices, such as mobile phones, tablets, laptops, desktops, and dedicated work stations.

FIG. 1 illustrates a functional view of a network-based user access environment 100 that provides an access control system 102 having a portal 104 through which a user is able to not only log in to the system for accessing computer applications, but which also automates the onboarding of new users, the offboarding of users, and changes to user roles. In some embodiments, the network-based user access environment may be implemented using the system disclosed in FIG. 15. An example embodiment of the network-based user access environment is disclosed in FIG. 3.

The portal 104 may be accessible through a communication network 106, for example, through a Uniform Resource Locator (URL) selected by a user, at a computing machine or device accessing the network 106. The access control system 102 manages user access authentication by determining a user's roles within an organization (or within external partner organizations) and providing the user access to computer applications corresponding to that user's role. Onboarding is the initial process of provisioning computer application access to a user that is signing on to the environment 100 as an entirely new user or as a previous user that had been removed from access. Onboarding can occur for new employee hires, for example. Offboarding is essentially the opposite process, i.e., removing a user from the environment 100.

The access control system 102 can provide, in a single computing system, the portal 104 as an interface for managers, administrators, etc. through which access privilege policies may be set by security rules, where user groups can be defined and group access roles set.

The access control system 102 can automate access by performing a risk assessment (e.g., a dynamic scoring) for a user and determining from that risk assessment which computer applications the user should be allowed access and, in some instances, the conditions upon which that access may be automatically changed by the system.

The access control system 102 can, in certain implementations, provide "suggested access" roles to a user. Thus, in some examples, user access rights are assigned under conditions independent from the user's request, the user's manager's request, or the user's external business unit's relationship with the other information systems in a network.

To provide a single access portal for offboarding and onboarding, as well as normal computer application usage, the access control system 102 deploys an abstraction/integration layer 108 that lies between the access portal 104 and an application layer 110. The abstraction/integration layer 108 manages all requests made through the portal, resolves the type of request, determines an appropriate pipeline for implementing the request, and communicates with the application layer 110 to specifically resolve the request. An example series of abstraction layer pipelines are shown 112, 114, 116, and 118, which may each represent different types of requests, including, by way of example, requests to onboard a user, requests to offboard a user, requests to change user access rights, requests to change user group assignments, requests to access previously assigned computer applications, requests for tasks to be assigned to users, requests for "suggested access" rights that may be reviewed by a user or a user's manager, requests for access risk score values, and other requests that will be apparent from the examples described herein.

While further details are provided below, in the illustrated example, the application layer 110 includes an IP Multimedia Subscriber Identity Module (ISIM) 120 that provides contains parameters for identifying and authenticating the user to an IP Multimedia Subsystem (IMS), a Lightweight Directory Access Protocol (LDAP) module 122 for sharing information about users, systems, networks, services, and applications throughout the environment 100, a user roles processing module 124 for processing onboarding and offboarding requests, and a risk scoring module 126 for scoring user access to computer applications to be used by the roles processing module 124 for real time decisions on what access to grant users.

To facilitate these access control processes, the system 102 may be communicatively coupled, through the network 106, to various other network-enabled systems. In the example of FIG. 1, these include a network-enabled health information system 128, a first external partner system 130 and a second external partner system 132. The external partner systems 130 represent dedicate computing systems, separate from the access control system and which may have multiple users and multiple computer applications. The users may access the portal 104 for onboarding, offboarding, etc. The computer applications may be accessed by uses of the respective external partner system or by users elsewhere in the environment 100. For example, through the use of the abstraction/integration layer 108, a user anywhere in the environment 100 may be granted access to computer applications on any of the external partner systems 130, 132, etc. if the access control system 102 determines that access is to be granted.

Beneficially, the abstraction/integration layer 108 allows not only for onboarding and offboarding, but each of these processes may be managed in a much faster way by the system 102. The abstraction layer may be a batch process that executes access requests from the user portal 104, and also updates the status of these access requests back to the user portal 104. Generally, the abstraction layer 108 may be a pass through and does not store any information. The abstraction layer 108 may use an identity and access management platform (e.g. the Salesforce API) to pull the transactions from the user portal 104 and uses secure provisioning platforms to process them in the back end systems. The abstraction layer 108 relies upon an internal decision engine that identifies the request type from the portal and then uses a particular assembly line ("AL" or assembly lines "AL's") to managing completion of the request. The AL's include, for some requests, using optimized application program interfaces (APIs) calls to various applications, as discussed further hereinbelow.

The access control system 102 may be implemented into existing cloud-based systems, such as identity-as-a-service (iDaaS) cloud-based systems. In some examples, the system 102 may be used to replace those systems, SSO systems, and other similar systems, altogether.

In general, the system 102 provides a cloud-based security solution, providing a self-service identity and access management (Self Service IAM) portal that enables employees access to the systems needed to perform their roles, including various roles in healthcare and health information systems businesses.

Figure 2:
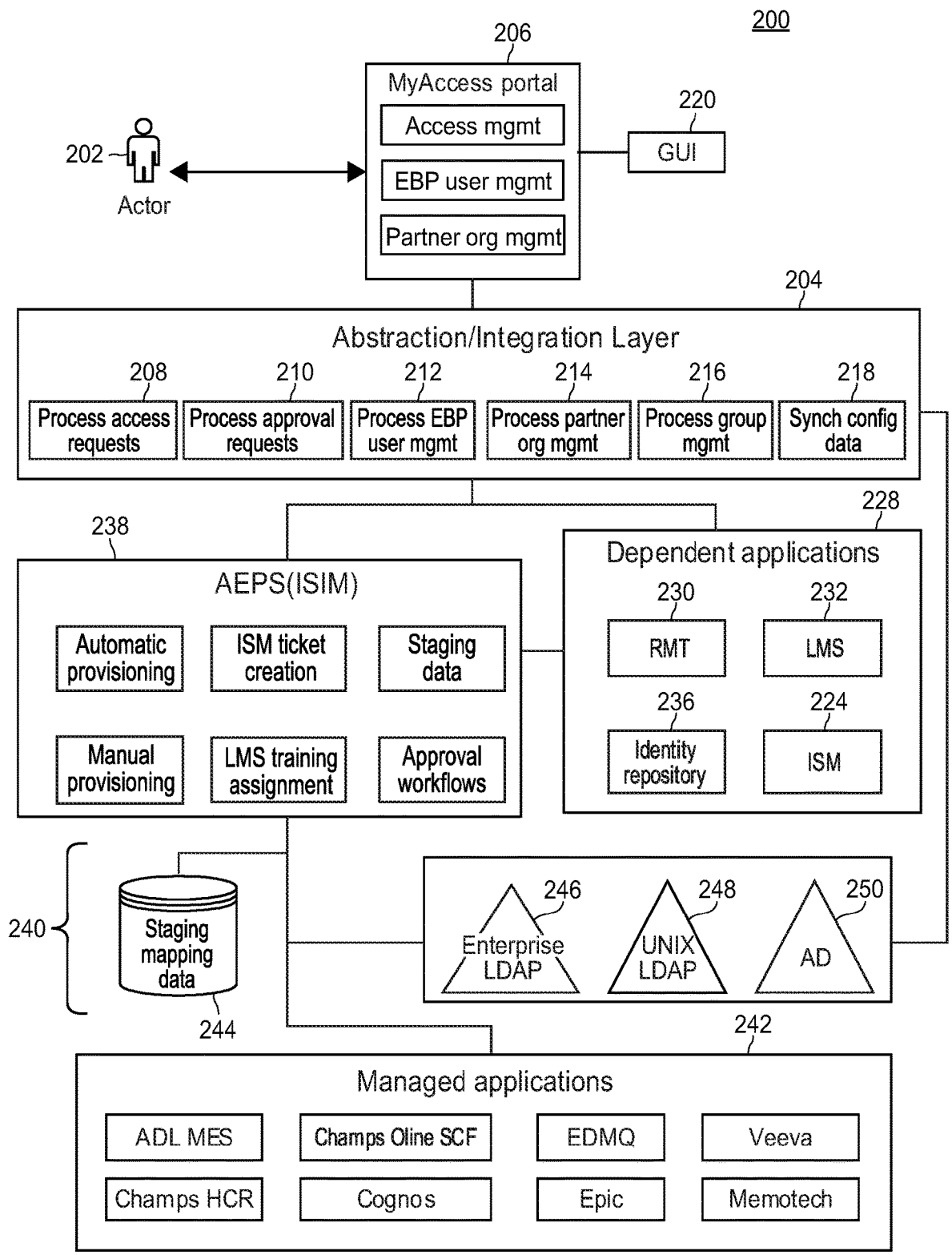
FIG. 2 illustrates a schematic of an access control system architecture with an abstraction/integration layer capable of onboarding and offboarding users and external partner systems, in accordance with an example.

FIG. 2 illustrates an example high-level implementation of an access control environment. A more particular access control environment is disclosed in FIG. 3. Access control environment 200 allows a user 202 to access various applications through an access portal 206 and an integrated abstraction layer 204. In some embodiments, the access control environment may be implemented using the system disclosed in FIG. 15. The abstraction/integration layer 204 may be a centralized layer of the environment 200 that includes a plurality of operational modules, selectively interfacing with one another, through control of the abstraction layer 204. These modules include a process access request module 208, a process approval request module 210, a process external business partner user management module 212, a process partner organization management module 214, a process group management module 116, and synchronization module 218 for synchronizing configuration and other data.

The access portal 206 may be implemented as an application that includes a graphical user interface module 220 for interfacing with the user 202. The access portal 206 may be implemented through a dedicated user computer processing device such as a mobile phone, tablet, laptop or desktop computer, or workstation, while in other examples the portal 206 resides on a network accessible computer processing device, such as a network-accessible server. The GUI module 220 controls display of different input screens to the user 202 through a display (not shown). The GUI module 220 receives input data from the user 202. The portal 206 further includes an access management module 222 that provides user and others an ability to request/remove access on specific applications integrated with portal, an external business partner module 224 that provides functionality to external business partners, and a partnering management module 226 that provides identity owners and custodians the ability to manage accounts of partner users.

The abstraction/integration layer 204 interacts with the user portal 206 and controls communications between the portal 206 and downstream applications in an application layer. In an example, the abstraction layer 204 may be implemented as a collection of Assembly Lines (ALs) that fetch data from the portal 206, resolve the request data to determine one or more target applications, after which, the ALs submit the request data to those downstream target applications. Further still, the abstraction layer 204 synchronizes user tasks and other metadata information from downstream applications to a portal repository.

In these and other ways, the abstraction/integration layer 204 may (i) act as a client for the portal and processes portal requests, (ii) act as a "web service provider" for processing requests from the portal in real time, (iii) check on pending requests and tasks periodically, and (iv) resolve pending requests and tasks to identification and access to users of medical information system.

In the illustrated example, the abstraction/integration layer 204 communicates with a dependent applications layer 228 that includes backend applications, such as a RMT application 230, an LMS application 232, an ISM application 234, and an identity repository 236. Each of these applications can be stored in a single computing environment, such as on an applications server. However, it will be appreciated that these computer applications, executed in software, hardware, or otherwise, may each be stored on separate dedicated computer systems communicating with the abstraction layer 204 through network communication. The same is true for any of the computer applications, modules, and systems described herein.

Other target applications for the abstraction layer 204 include an Account Entitlement and Provisioning System (AEPS), which may be an IBM Security Identity Manager (ISIM) solution (AEPS ISIM 238). The AEPS ISIM application 238 performs a number of functions including automatic provisioning, manual provisioning, ISIM ticket creation, LMS training assignments, staging data, and approval workflows. The abstraction layer 204 utilizes ISIM APIs to process the access requests from the user portal 206. ISIM connects to back end applications directly or via an adapter that connects to a resource (e.g. IBM ServiceNow) to provision or deprovision access to the target applications.

The abstraction layer 204 communicates with a repository layer 240 and a managed applications layer 242. The repository layer 240 includes a network-accessible storage mapping data database 244, a network-accessible enterprise level Lightweight Directory Access Protocol (Enterprise LDAP) server 246, a network-accessible Unix LDAP server 248, and an active directory (AD) database 250.

The managed applications layer 242 includes any number of applications including, for example, but not limited to an EDM Quality application, and an EPIC application or database. The portal allows the users to request and access, and manages and tracks, the training completion for the access in a centralized place.

Figure 3:
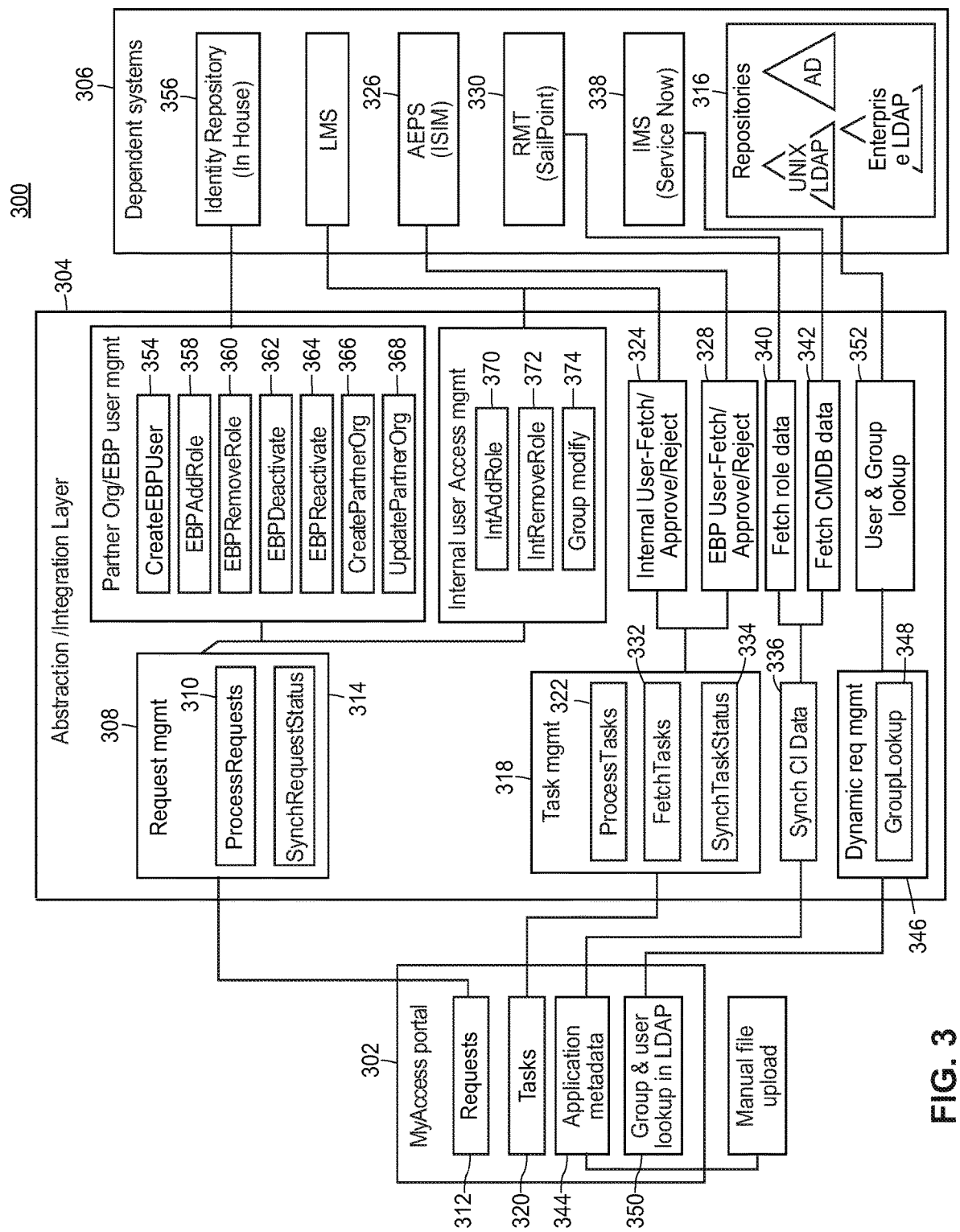
FIG. 3 illustrates a detailed example of an abstraction/integration layer showing a series of resolving modules and request-specific assembly lines communicating with downstream applications in an optimized manner, in accordance with an example.

FIG. 3 illustrates an access environment 300 similar to that in FIG. 2. In some embodiments, the access environment may be implemented using the system disclosed in FIG. 15. The environment 300 expressly shows various assembly lines (ALs) that have been generated to communicate data between a portal 302 and an abstraction/integration layer 304 and between the abstraction layer 304 and a dependent application layer 306. The abstraction/integration layer 304 may utilize ALs that cover request management, task management, synch configuration information, and handle dynamic request management. These ALs may further make use of resolvers to handle each particular type of request, task, synchronization, or lookup. The resolvers may be components of the ALs, and in other cases the resolvers may be standalone components separate from the ALs, but still within the abstraction/integration layer 304. The portal 302 may be a front end system configured to handle requests by users. The abstraction layer 304 may be a server configured to handle and process requests received from the portal 302 and eventually sent to the dependent systems 306. For example, the abstraction layer 304 may make use of an IBM® Tivoli Directory Integrator server to perform some of the actions disclose herein. The environment 300 further includes ALs between the abstraction layer 304 and a repository layer 308. It will be appreciated that the abstraction layer 304 may communicate with other layers and systems, for example with a managed application layer (not shown).

Generally, the abstraction/integration layer 304 may be configured to handle access commands originating from at least one source application (e.g. the portal 302) utilizing a first format, directed to at least one destination application (e.g. any of the dependent systems 306) utilizing a second format. The requests may include data payloads including data that is required to perform particular actions. The portal 302 and any of the dependent systems 306 may not share a common format for data that allows for native exchange of information. Accordingly, the abstraction/integration layer 304 may handle requests/access commands and data payloads received from the portal 302 and manipulate (i.e. translate) them into a common format that is usable by the dependent systems 306. Translating the data payload may include removing particular data included in the data payload, adjusting the values of data stored in the payload, augmenting, or adding, data to the data payload, or combinations thereof. Similarly, in some embodiments, the request, or access command, may be translated into a different format compatible with the destination application. The abstraction layer 304 may determine the type of access command based on the data payload, and more particularly, the AL to use for handling the command and data payload. The abstraction layer 304 may generate an action for a dependent system to perform based on the type of access command and the data payload.

The abstraction layer 304 may translate the data payload into a common format, wherein the common format may be determined using the first format (e.g. a format corresponding to the portal 302) and the second format (e.g. a format corresponding to the target dependent systems 306). The common format may include identifying information on the user, information on the originating source application, and information on the destination application. Translating the data payload into a common format may include utilizing an application programming interface (API) that defines a set of protocols for translating data (e.g. what data to keep, what data to change, what data to remove) received from a particular source application destined for a particular destination application. Similarly, translating may include using a tailored lookup table that includes application entries and translation values for the abstraction layer 304 to adhere to when processing requests/commands. The abstraction layer 304 may store any API, or tailored lookup table, to the abstraction layer 304 may access either from a source application, destination application, or some other source.

The abstraction layer 304 may respond to the access command using the action and the translated data payload. By responding, the abstraction layer 304 may direct the data in the data payload and the action to the appropriate dependent systems 306. Responding to the action may include adhering to decisional logic set by the destination application. The decisional logic may dictate whether an action is taken. In one embodiment, the abstraction layer 304 may transmit a notification to a user at the portal 302 of the success or failure for their request while simultaneously transmitting the translated data payload and action to the at least one destination application. The response to the user may occur after confirmation of the action being executed by the at least one destination application.

The abstraction layer 304 may make use of a variety of ALs tailored to particular tasks to handle the functionality disclosed herein. In an example embodiment, a user may submit an access command, which may be a request to modify rights, privileges, resources, or combinations thereof, assigned to the user, through the portal 302. The request to modify may also be a request to on-board a user to at least one destination application, or a request to off-board the user from at least one destination application. The access command, or request, may be handled by the abstraction layer 304. More particularly, in the abstraction layer 304, a Request Management assembly line control module 308 includes a Process Requests resolver 310 that obtains requests from a requests table 312 in the portal 302 and submits those requests to downstream applications. The Request Management control module 308 also includes a SynchRequestsStatus resolver 314 that checks the status of the existing request in the downstream applications and updates the status in a repository 316.

Similarly, the user submitted access command may also be a task submitted by the user through the portal 302. The abstraction layer 304 may handle the task in part by using a Task Management assembly line control module 318 that includes a series of resolvers in communication with a Tasks table 320 in the portal 302. A ProcessTasks resolver 322 reads, approves, or rejects actions taken by a manager (shown as labeled assembly line 324) and updates an ISIM system 326 (e.g., for internal users). For external users, the ProcessTasks resolver 322 reads, approves, or rejects actions taken by a manager (shown as labeled assembly line 328) and updates a RMT (e.g., SailPoint (for EBP users)) system 330.

A FetchTasks resolver 332 reads the pending tasks from the ISIM 326 (via assembly line 324) and from the RMT 330 (via assembly line 328) and updates them in the repository 316. Ultimately, a role assignment request is either approved or rejected.

A SynchTasksStatus resolver 334 processes the tasks which have been pending in the repository 316, such as tasks stored in the repository 316 for more than threshold amount of time and checks the status of those tasks in the RMT 330 or in the ISIM 326. Task status checks are useful for when a user directly updates the approval/rejection status in one of the RMT 330 or the ISIM 326, but not in the tasks list 320 of the portal 302.

The abstraction layer 304 further includes a Synch CI Data resolver 336 that reads the Configuration Information (CI) from an IMS 338 and updates that information in the repository 316. The Synch CI Data resolver 336 for example shows two labeled assembly lines. A fetch role data assembly line 340 and a fetch configuration management database (CM DB) data assembly line 342. The abstraction layer 304 may initiate the Synch CI Data resolver 336 and generate these assembly lines 340 and 342, in response to application metadata requests 344 from the portal 302.

The abstraction layer 304 further includes a dynamic request management assembly line control module 346 that includes a Group Lookup resolver 348 that generates, in response to a request 350, an assembly line request 352. The assembly line 352 may be used to request information on user groups, information such as which groups a user is assigned to, which groups are recommended for a user being onboarded, changes to group access roles. The assembly requests that information from the repository 316, which may include an enterprise LDAP server, a UNIX server, an AD database, etc. In some examples, the repository a Salesforce server storing group-related data.

The abstraction layer 304 may be able to collect and act upon a set of user characteristics for the users of the portal 302. In particular, the abstraction layer 304 may be able to generate a dynamic identity score for the user based on the set of user characteristics. This dynamic identity score may be used to generate the action corresponding to the user's request. The user characteristics may include user identifiable information, what type of user it is, if the user has any group membership that is relevant to a request, or combinations thereof. In some embodiments, the abstraction layer 304 may utilize the dynamic request management module 346 to execute these actions.

The assembly lines generated and utilized by the abstraction layer 304 are able to provide real time information access to multiple downstream systems, in response to multiple different types of requests from the portal 302. The abstraction layer 304 may generate a dynamic identity score for a user as part of the process of generating an action based on the user's request. In particular, the abstraction layer 304 may able to collect system characteristics for the applications in the dependent systems 306, through the use of the assembly lines, such as: current runtime statistics, number of authorized users for a requested application, and a threshold level of users for the requested computer application. In one embodiment, the threshold level may be the number of users that an application can handle where a request for access that would put the requested application over the threshold is denied. The abstraction layer 304 may, in part, determine the dynamic identity score based on the system characteristics to determine whether to grant access to the user. The dynamic identity score for a user may determine whether a user's requested action is granted or denied based on whether the dynamic identity score is above or below a threshold. In some embodiments, the abstraction layer 304 may utilize the dynamic request management module 346 to execute these actions.

The Request Management control module 308 uses the ProcessRequest resolver 310 and the SynchRequestsStatus resolver 314 to manage various assembly lines. The control module 308, like the other control modules in the abstraction layer 304 provided a centralized resolution of portal requests. Those requests may be user specific, such as when an external business partner wants to onboard or offboard a user or change a user's role from one role in the enterprise to another role. Those requests may be role specific, such as when an external business partner wants to change tasks, rights, etc. associated with a particular role to which user may be assigned.

The abstraction layer 304 can resolve requests obtained from an external partner computer system, such as systems 130 or 132 of FIG. 1. In one example, a group of assembly lines (ALs) are generated for interaction with external partner computer systems requests and queries (i.e., Partner Organization Management). A CreateUser assembly line 354 may be used to create a new external business partner user through a portal request. In an example, the portal may be accessed through a front end system, such as a Salesforce Platform (available from Salesforce of San Francisco, Calif.), used for case management and task management. For the CreateUser AL 354, the abstraction layer 304 first processes the request by sending a request to an identity repository manager (IDM) 356, which may provide status updates in response to the SynchRequestsStatus resolver 314. An AddRole assembly line 358 may be generated when an external partnering system is adding a new role to an existing user's access responsibilities. A RemoveRole assembly line 360 may be used to resolve a request to remove a role from a user's access. A Deactivate assembly line 362 may be used to deactivate a user completely, removing all their roles and accesses. A Reactivate assembly line 364 may be used to reactivate a previous deactivated user. The Reactivate assembly line 364 may be used to restore only the user, in which case the user must still be granted access and roles through further requests, such as subsequent the AddRole request assembly line 358. In other examples, the Reactivate assembly line 364 may restore a user to previous access roles, as indicated in stored data in the IDM 356 or elsewhere in the repository 316. The SynchRequest resolver 310 manages the determination of whether reactivation results in automatic re-provisioning of role access or not.

Other assembly lines include a CreatePartner Organization assembly line 366, which may be used to onboard a new external partnering system and it's user for access by the access control system. A ModifyPartner Organization assembly line 368 may be used to allow external partnering systems to modify their roles, groups, users, user access rights, group access rights, etc.

For internal requests, not from external partnering systems, an Add Role assembly line 370 may be provided and routes requests to the ISIM 326 for adding a new role to an existing user in the internal system accessing the portal 302. To a remove a role from an internal user, an Internal User Remove Role assembly line 372 sends a request to the ISIM 326. In other examples, access roles can be added or removed on a group level, e.g., through a Group Modify assembly line 374. The ISIM 326 may provide a portal administrator access, for example, where the administrator has the ability to fully administer the portal 302 hosted on an existing platform, such as on a Salesforce Platform. The administrator, in some examples, may have a Privileged identity management (PIM) or Privileged Access Management (PAMS) access through the portal 302. Instead of accessing only the ISIM 326, in some examples, the assembly lines 370, 372, and 374 manage their requests by sending a request to one or more of an Enterprise LDAP server, UNIX LDAP server, or AD database in the repository.

Figure 4:
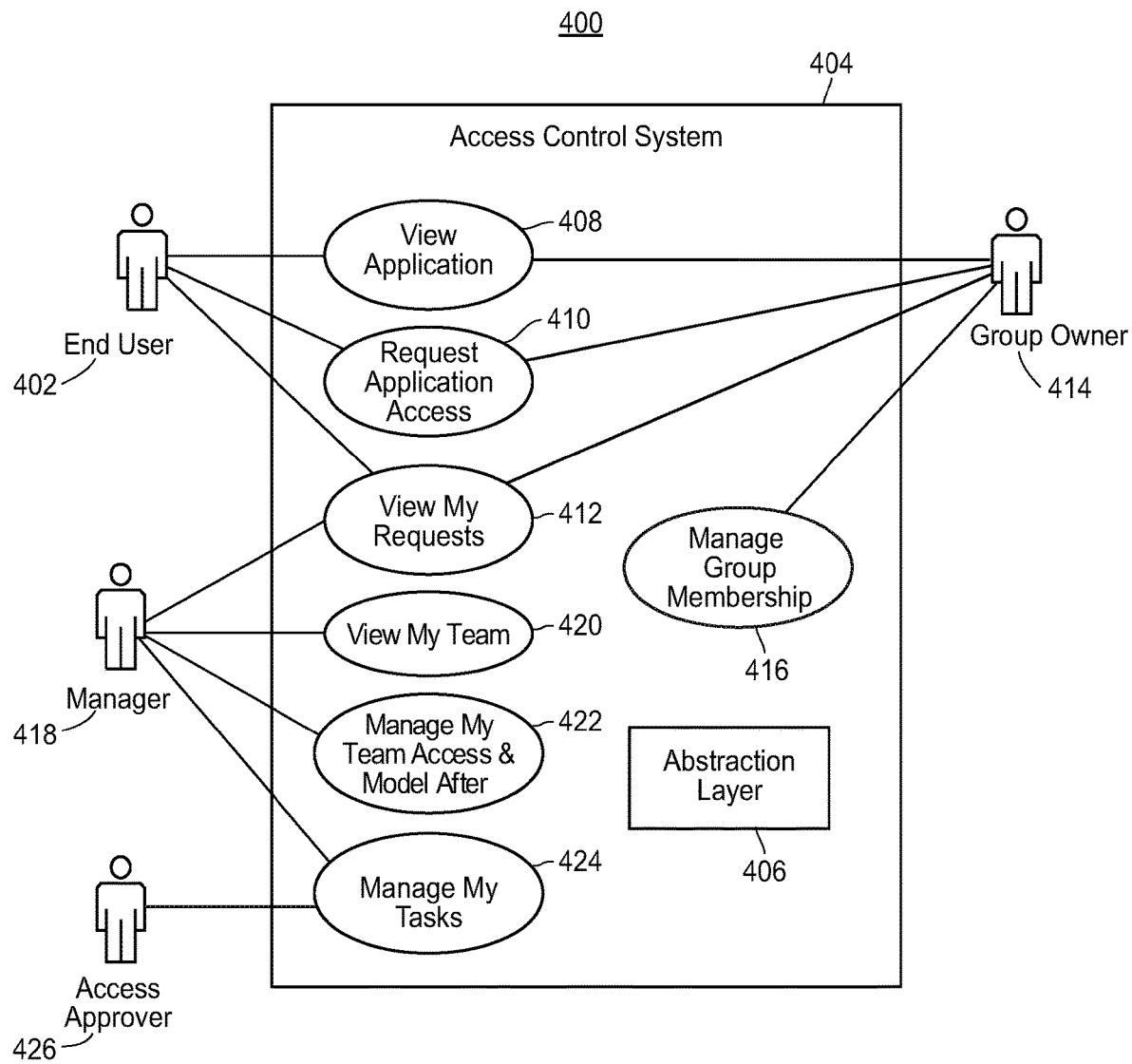
FIG. 4 illustrates a behavioral diagram describing various use case scenarios for end users and managers, in accordance with an example.
Figure 15:
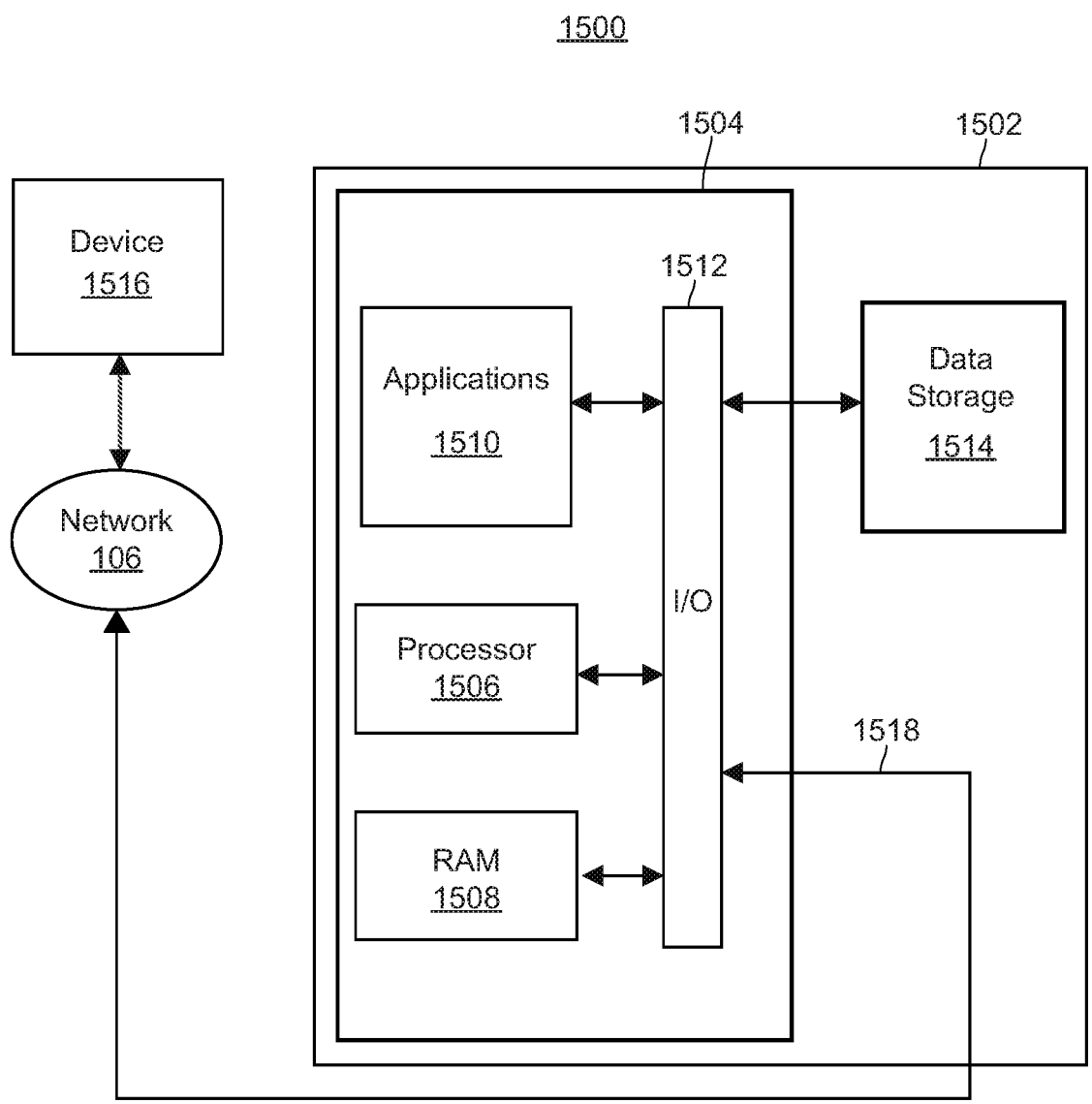
FIG. 15 illustrates an example computer system for performing the functions of any of the architectures disclosed herein, as well as any of the interaction workflows for the embodiments discussed herein.

FIG. 4 illustrates a behavioral diagram 400 describing various use case scenarios for end users and managers, as may be implemented in the systems described herein, such as the system described in FIG. 3 and/or FIG. 15. An end user 402 may be able to access through centralized access control system 404, employing an integrated abstraction layer 406, a series of operations, each accessed through assembly line calls from the abstraction layer, including viewing applications 408, requesting application access 410, and viewing user reports 412. In each instance, the user may be part of a group of users, sharing a similar persona, where an assigned group owner 414 has access to the applications 408, 410, and 412 through the same abstraction layer. The group owner 414 can change roles, by adding or deleting roles for the group. The group owner 414 can change users in the group by adding or removing members through a manage group membership application 416.

A manager 418 may be able to access applications through the access control system 404. The manager 418 can access the review reports application 412, a view team application 420, a manage team access application 422, and a manage tasks application 424.

Figure 5:
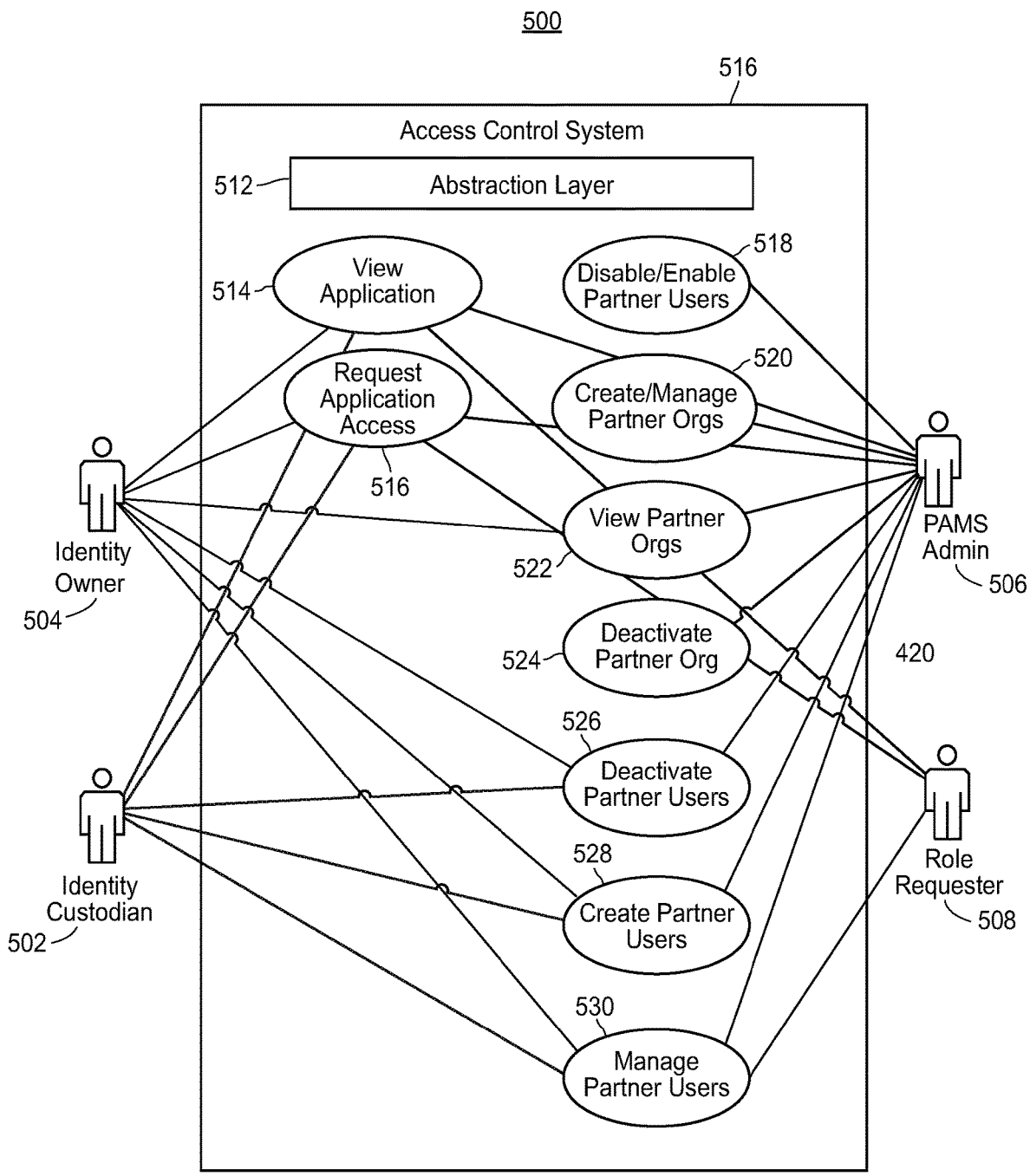
FIG. 5 illustrates a behavioral diagram describing various use case scenarios for various external partnering system users, in accordance with an example.

In the illustrated example, an access approver 426 provides separate access approval for the manager 418. That access approver 426 may represent a dedicate access regulator such as an information technology (IT) administrator, a health information systems (HIS) administrator, etc.

Where FIG. 4 provides a behavioral diagram for an end user, manager, group owner, and access approver, all within a dedicated system, FIG. 5 illustrates a behavioral diagram 500 describing various use case scenarios for various external partnering system users including that of an identity custodian 502, an identity owner 504, a PAMS administrator 506, and a role requestor 508. Similar to FIG. 4, FIG. 5 may use the system described in FIG. 3, and/or FIG. 15. Each of the external partnering system users may be able to access one or more of applications through a centralized access system 510 with an abstraction layer 512, as described herein. The applications include an applications view 514, a request application access application 516, a disable/enable partner users application 518, a create/manage partner organizations application 520, a view partner organization application 522, a deactivate partner organization application 524, a deactivate partner user application 526, a create partner users application 528, and a manager partner users application 530. The abstraction layer 512 may be able to handle all requests and tasks generated by the applications listed in FIG. 5.

FIGS. 6 to 11 provide a series of example workflows that may be executed using the system depicted in FIG. 3, and/or the system depicted in FIG. 15. In some embodiments, the workflows are for example assembly line calls to the ISIM. Additionally, the workflows may make use of the resolvers described in FIG. 3. For data validation, each workflow may have a script node at the start of the workflow that will validate if the required parameters are available before processing the request from the corresponding assembly line. If any of the mandatory fields are not available, the request will be "failed" and a notification will be sent to requestor for display at the portal. For approved requests, the access request can be for granting specific access to a computer application or removing access to a computer application, for example, i.e., for providing or removing access rights to a user. For access requests that require approvals, the approver's user identification (ID) is validated (e.g., by verifying that user is present in ISIM and has email address field populated) and the approval notification is sent to the approver. By way of example, the approver can be the user's manager within a system (i.e., the internal system manager 418), a dedicated access approver (such as approver 426). In other scenarios the approver can be an external partnering system approver, such as the PAMS administrator 506 or the identity custodian 502. In cases where the approver cannot be validated, an IAM Administrator is notified via a Request For Information (RFI) managed by the abstraction layer. The IAM Administrator can then get the approval manually and then submit the RFI with approval details or fail the request, either of which is communicated through back to the abstraction layer. If the Approver rejects the access request, the ISIM will "fail" the request and notification will be sent to affected user through the portal. If the Approver approves the access request, the request passes to the next node in workflow, as shown. This varies for each application.

Notifications are achieved within the workflow, as well. The ISIM has built-in capability to send email notifications to users on tasks such as approvals, requests for information, and informative notifications such as request completion and reminders.

Additional notification templates (e.g., from current PAMS system) may be added to the ISIM and used specifically for PAMS notifications. The abstraction layer may use the following triggers, captured from a portal (in this example from a Salesforce Platform) in performing workflows with notification templates: Partner Organization Change, Disabled Partner Organization, New Identity Owner/Custodian, and Identity Owner/Custodian change. In the workflows described, the business role related notifications may be managed by the existing RMT system integration with a client side mail server. The abstraction layer may use the following triggers for such notifications: Role approval request for Role owner and Role addition or removal for end user. For all notifications in workflows, escalation participants can be defined in the workflow using the out of box ISIM functionality. By default, this functionality may be set to the User's Manager. For inactive Identity Custodian or Identity Owner accounts, notifications will be sent to the IAM administrator or PAMS administrator group. The ISIM system may have an identify feed that fetches PAMS users from Identity repository and creates an ISIM person record and starts the rest of the provisioning process. The feed will be updated to read PAMS user status for "disable" field (Not "deactivate" which means de-provision the user) from Identity Repository and if it is set, then ISIM person's record will be set to "suspend".

Figure 6:
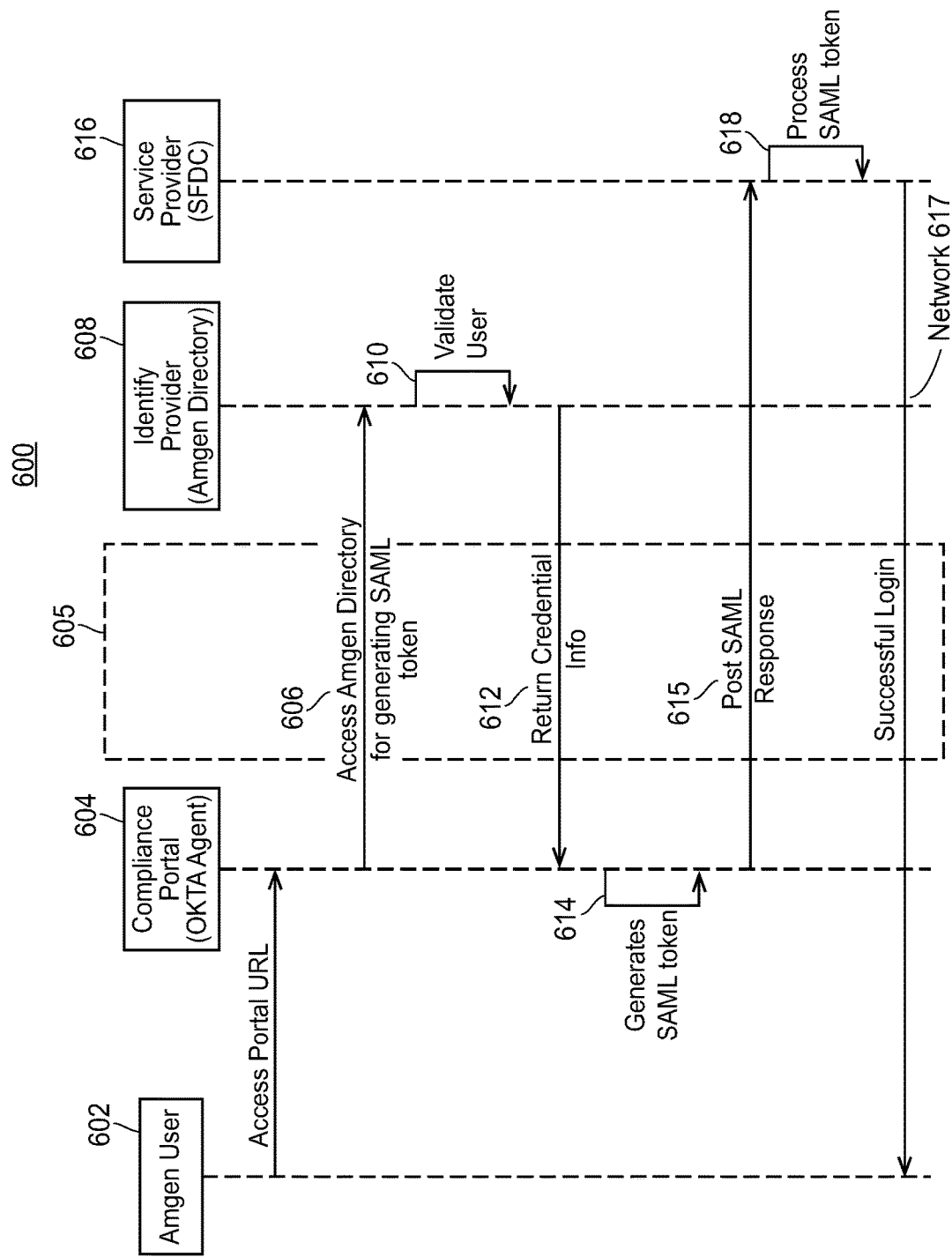
FIG. 6 illustrates an interaction workflow for a user access to an access control system, in accordance with an example.
Figure 13:
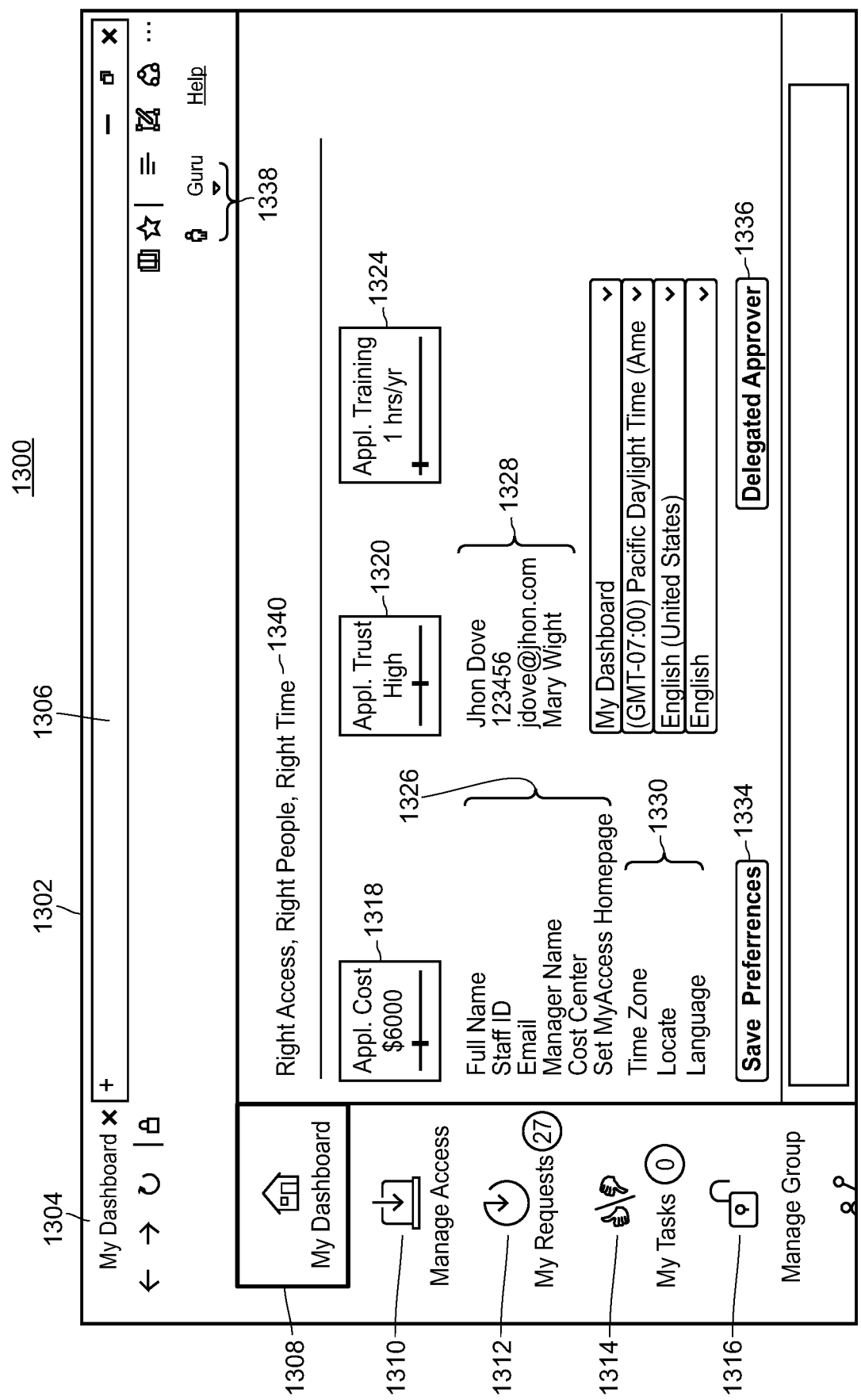
FIG. 13 illustrates an example screenshot for an interaction workflow for a user accessing an access control system, in accordance with an example.

FIG. 6 illustrates an example interaction workflow 600 for a user access to an access control system, such as those described herein. An example screenshot 1300 corresponding to the functionality of the interaction workflow 600 is shown in FIG. 13, described below. Initially, user 602 accesses a portal 604 through a computer device, such as computer terminal, desktop computer, laptop computer, smartphone, mobile phone, tablet computer, or other computing device, and, more particularly, through a Uniform Resource Locator (URL) identifier on the computer device. For example, the user may log in to their computer device and click on the URL for the portal 604. The portal 604 sends a request 606 via an abstraction layer 605 to access a local user directory 608 for generating an access token. In some examples, the portal 604 may be a Single Sign-On (SSO) agent, such as an OKTA agent, which may be an enterprise-grade, identity management service. In some examples, the portal 604 may be part of a Salesforce Platform access portal. The portal 604 may use a master identification to access the directory 608, such as administrator identification.

The directory 608 determines if the user is a valid user and validates the user at 610, upon confirmation, or a "fails" the user if confirmation occurs. Validation may occur, for example, by matching the administrator identification maintained in a first repository, such as a server or database of the repository 316, with a network identification stored for the user in the directory 608. Once the user is validated, the identify provider directory 608 will return login credential information 612 to the portal 604 through assembly lines in the abstraction layer 605. The portal, in response, generates a Security Assertion Markup Language (SAML) token 614. The SAMPL token 614 may be an XML markup language data token used for authentication and authorization between computerized systems.

At 615, the token 614 is communicated, by the abstraction layer 605, to a service provider 616, which in this example may be a Salesforce Platform server. That communication may occur over a network 617, in examples, where the downstream target application is an external partner service application, as the Salesforce Platform server is in the illustrated example. The service provider 616 processes the authentication token 614 at 618 and provides a successful login access to the user at 620. The successful login may result in a screenshot 1300 such as in FIG. 13. The user is now able to access the service provider 616.

Figure 7:
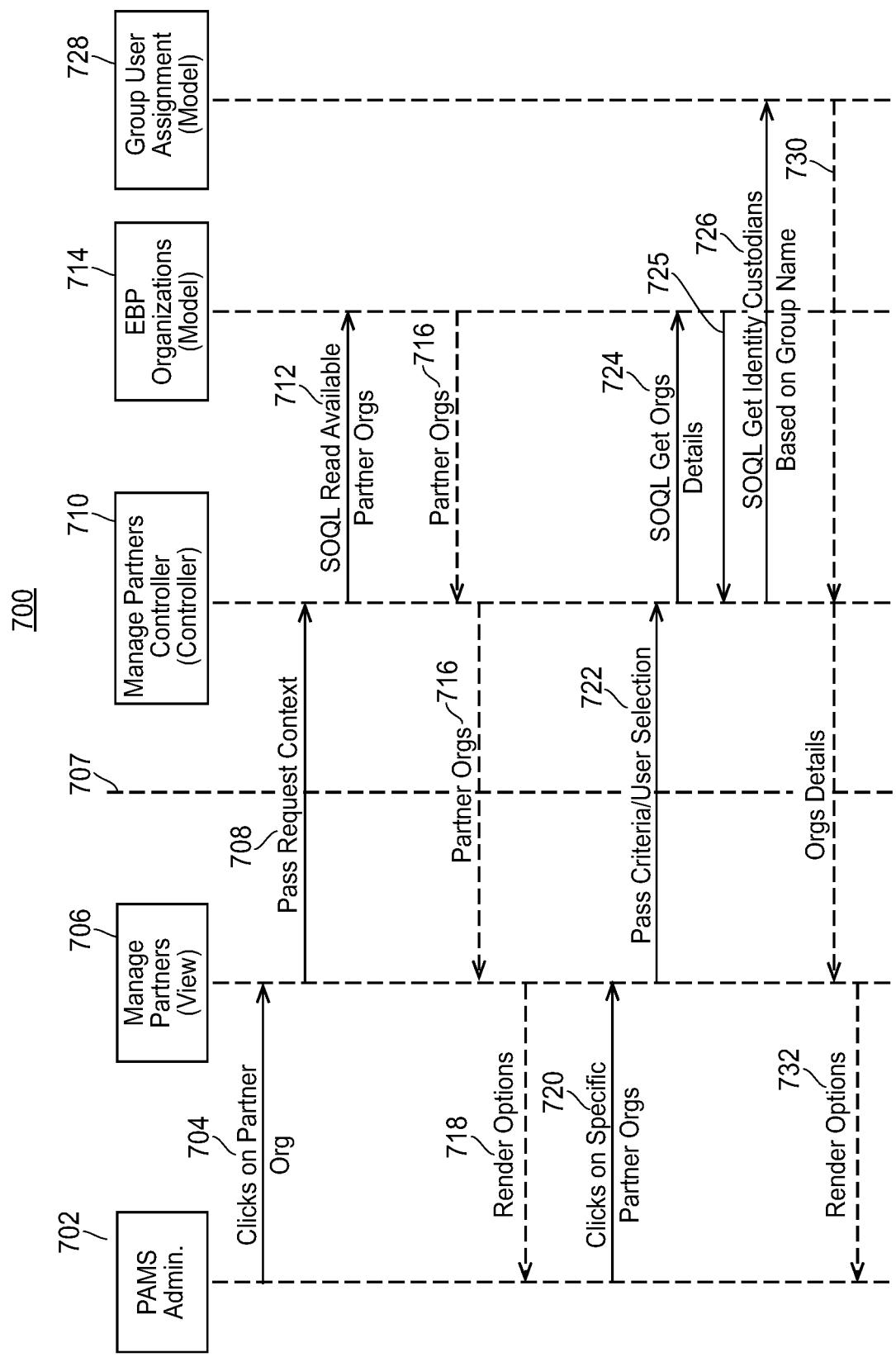
FIG. 7 illustrates an interaction workflow indicating the processes involved in creating and modifying an external partner system, in accordance with an example.

FIG. 7 illustrates a workflow 700 indicating the processes involved in creating and modifying an external partner system. A PAMS administrator 702 accesses the system and selects, at 704, to add an external partner organization through portal 706. A request 708 is generated and sent via abstraction layer 707 to a manager partner control program 710, using assembly lines of the abstraction layer 707. A request 712 to read available partner organizations is sent to a downstream application external partner organization listing program 714, which returns a listing of available partners 716 to the control program 710, which then sends the listing back to the portal 706 for rending options 718 for selection by the PAMS administrator 702. The administrator 702 selecting on one of the render options, at 720, has the selected option 722 sent from the portal 706 to the control program 710, which then sends a request 724 for organization details such as partner organization name, identity owner, identity custodian(s), status from the organization listing program 714, which responds with information 725. The program 710 also sends a request 726 to get the identity of custodians for the organizations from a group user assignment listing program 728, which responds with custodian information 730. The organization details 730 are provided to the portal 706 for display of options 732 that the administrator can select.

Figure 8:
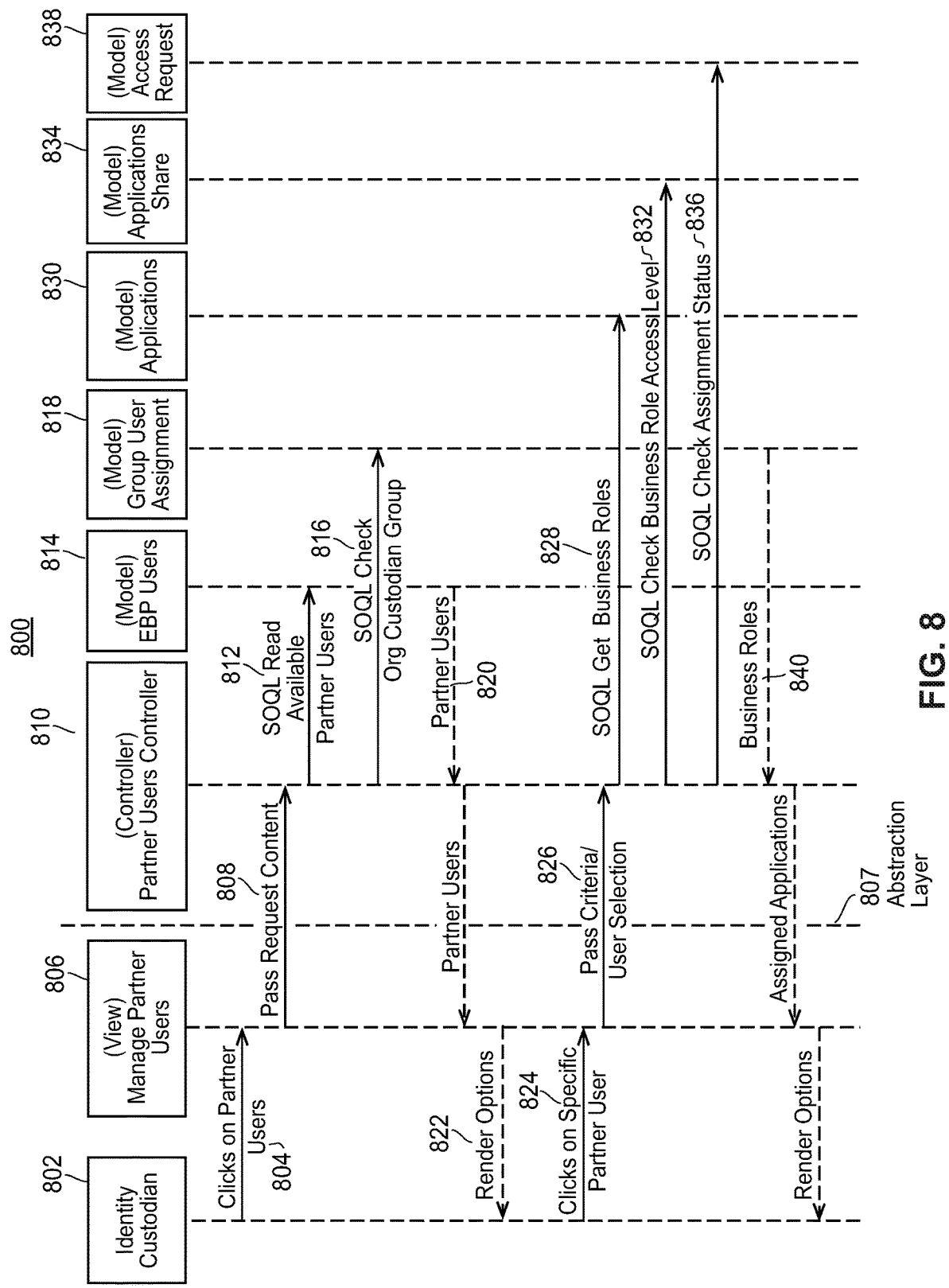
FIG. 8 illustrates an interaction workflow indicating the processes involved in creating and modifying the partner organization, in accordance with an example.

FIG. 8 illustrates a workflow 800 indicating the processes involved in creating and modifying the partner organization. An identity custodian 802 selects to access partner organization users at 804, which calls up a managing partner users view on a portal 806 and, through an abstraction layer 807 passes an access request 808 to a downstream partner user controller program 810. The downstream program 810 sends an available partner users request query 812, e.g., in the form of an object query language user read request to the appropriate external partnering system user manager 814. The downstream program 810 also sends an organization custodian group request 816, e.g., in the form of an object query language group read request, to a group user assignment manager 818.

The user manager 814 returns an identification of the partner users, at 820, to the control program 810, which then sends the identified partner users to the portal view 806 for display, rendering options 822 for the identity custodian 802 at the organization to select from. In response, the custodian 802 selects a specific user 824, which causes the abstraction layer 807 to receive and pass user selection data 826 (and any criteria data) to the partner user control program 810.

Identity custodian 802 accesses Manage Partner users view 806 which communicates with the partner user controller program 810. The partner user controller program 810 connects with EBP Users 814. In response, the group user assignment manager 818 responds with response presenting users in the partner organizations to which the identity custodians have access to. Identity custodian 802 can create a new user or update an existing user. The EBP User module 814 displays the business roles 830 assigned to the specified user and the available business roles 830 in the partner organization of the user. A modification initiates Access Request object 838. The partner user controller program 810 tracks the status of the access request 838. The identity custodian 802 can select another user and go through workflow again.

Figure 9:
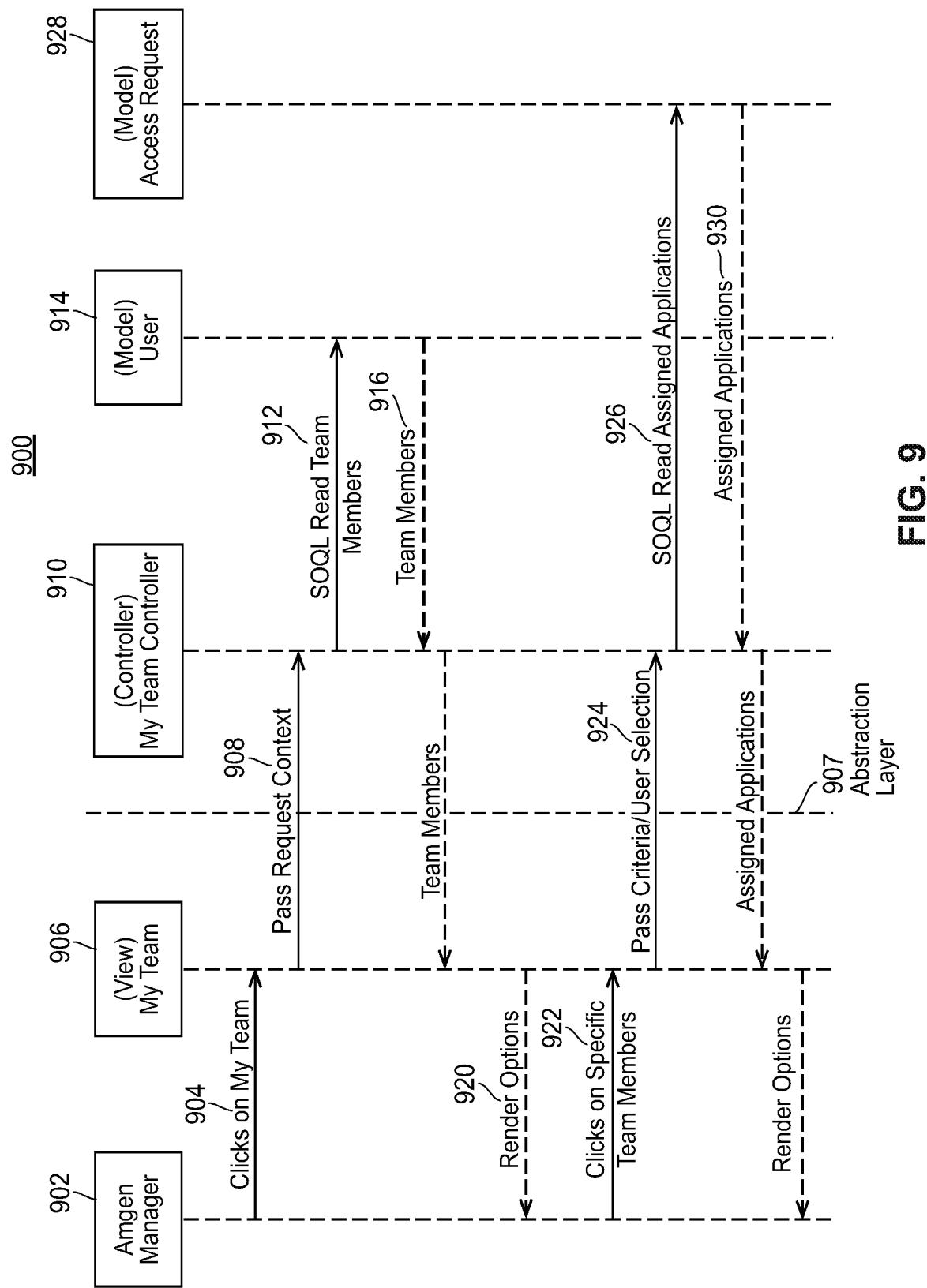
FIG. 9 illustrates an interaction workflow indicating processes involved in identifying users who report to a manager, and a manager requesting different access for his/her team members, in accordance with an example.

FIG. 9 illustrates a workflow 900 indicating the processes involved in reading the users who report to a manager and a manager requesting different access for his/her team members. A manager 902 selects their team 904, which is then displayed in a view on portal 906. An abstraction layer 907 sends 908 a request to a team controller downstream program 910. The program 910 sends a request 912 to identify team members to a user manager 914, which responds by identifying the team members 916 stored in a database. The program 910 responds through the abstraction layer to the portal 906 instructing the portal 906 to display the team members 916 on the portal 906, which renders options 920 available to the manger 902 for selection.

The manager may select a specific team member 922, which is sent by the portal 906 to the program 910, via a user selection 924 sent through an assembly line of the abstraction layer 907. With the particular team member selected, the program 910 sends an access request 926 to another downstream program 928, which responds with a listing 930 of the applications assigned to selected team member, where the listing is eventually provided to the manager 902, through the portal 906 for modification.

Figure 10:
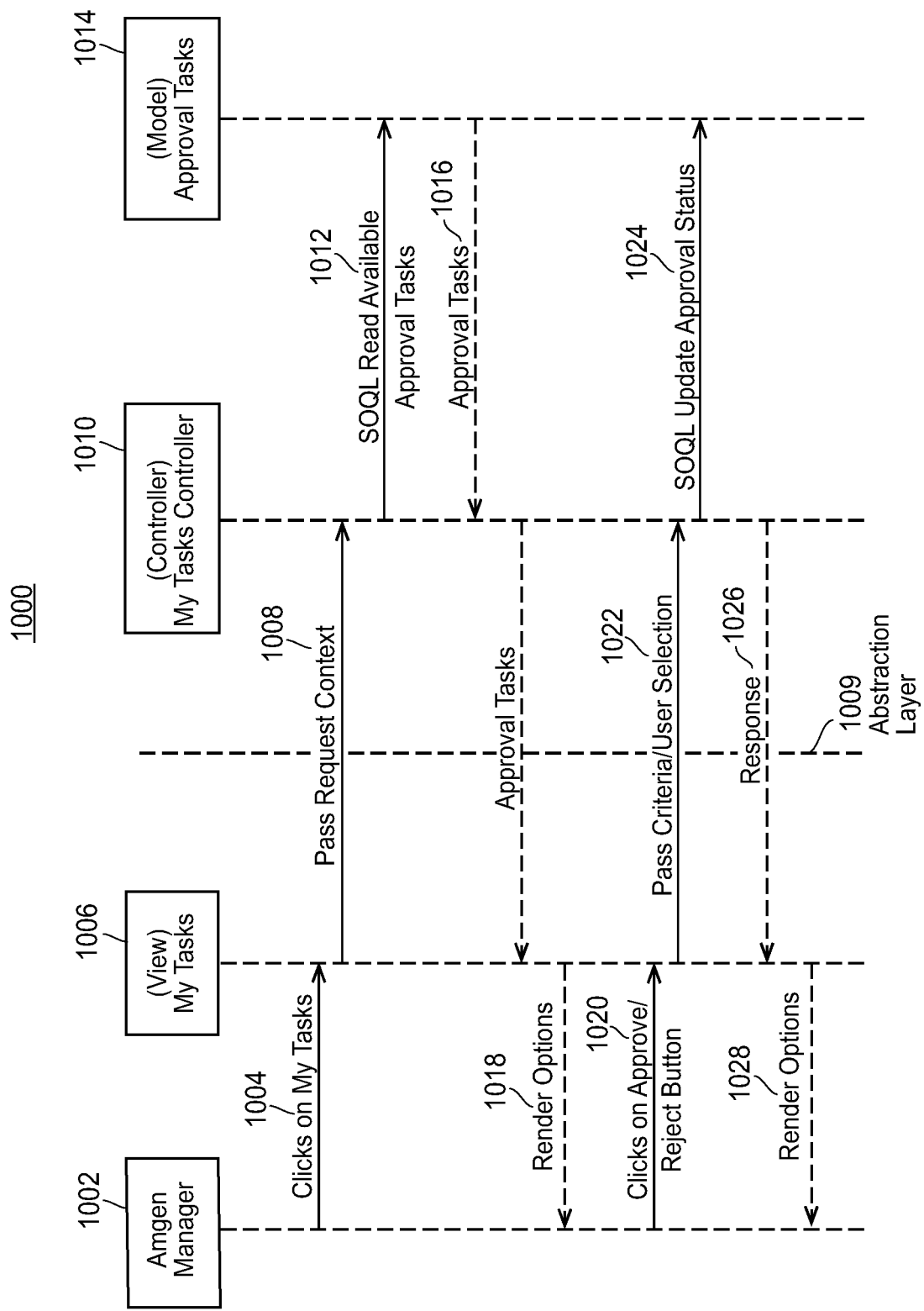
FIG. 10 illustrates an interaction workflow indicating the processes involved in creating and modifying tasks for a user, in accordance with an example.

FIG. 10 illustrates a workflow 1000 indicating the processes involved in creating and modifying the tasks for a user, in this example, a manager 1002. The manager selects tasks, at 1004, and their assigned tasks are displayed on at a portal 1006, which sends a request 1008, through an abstraction 1009 layer not shown, and more specifically through an assembly line thereof, to a task controller downstream program 1010. The program 1020 sends a read request 1012 to another downstream program 1014 that identifies approved tasks for the users of the particular system, whether internal system or external business partner.

The program 1014 identifies approved tasks 1016 which are passed through to the portal 1006 for rendering options 1018 to the manager 1002 for selection. The manager 1002 can select an action, such as approve or reject an assigned task, which is identified, at 1020, and communicated as a request 1022 to the task control program 1010, which then sends an update approve instruction to the program 1014, which updates its listing of assigned tasks for the manager 1002. For an approval request, the task is approved for the manager 1002, and that approval is communicated as a status update 1024 to the program 1014 where the approval is stored. For a rejection request, the task is not approved for the manager 1002. With the approval/rejection update sent, the task controller program 1010 sends a response 1026 to the portal 1006, and that allows the manager 1002 to make further changes to task assignments, through rendered options 1028.

Figure 11:
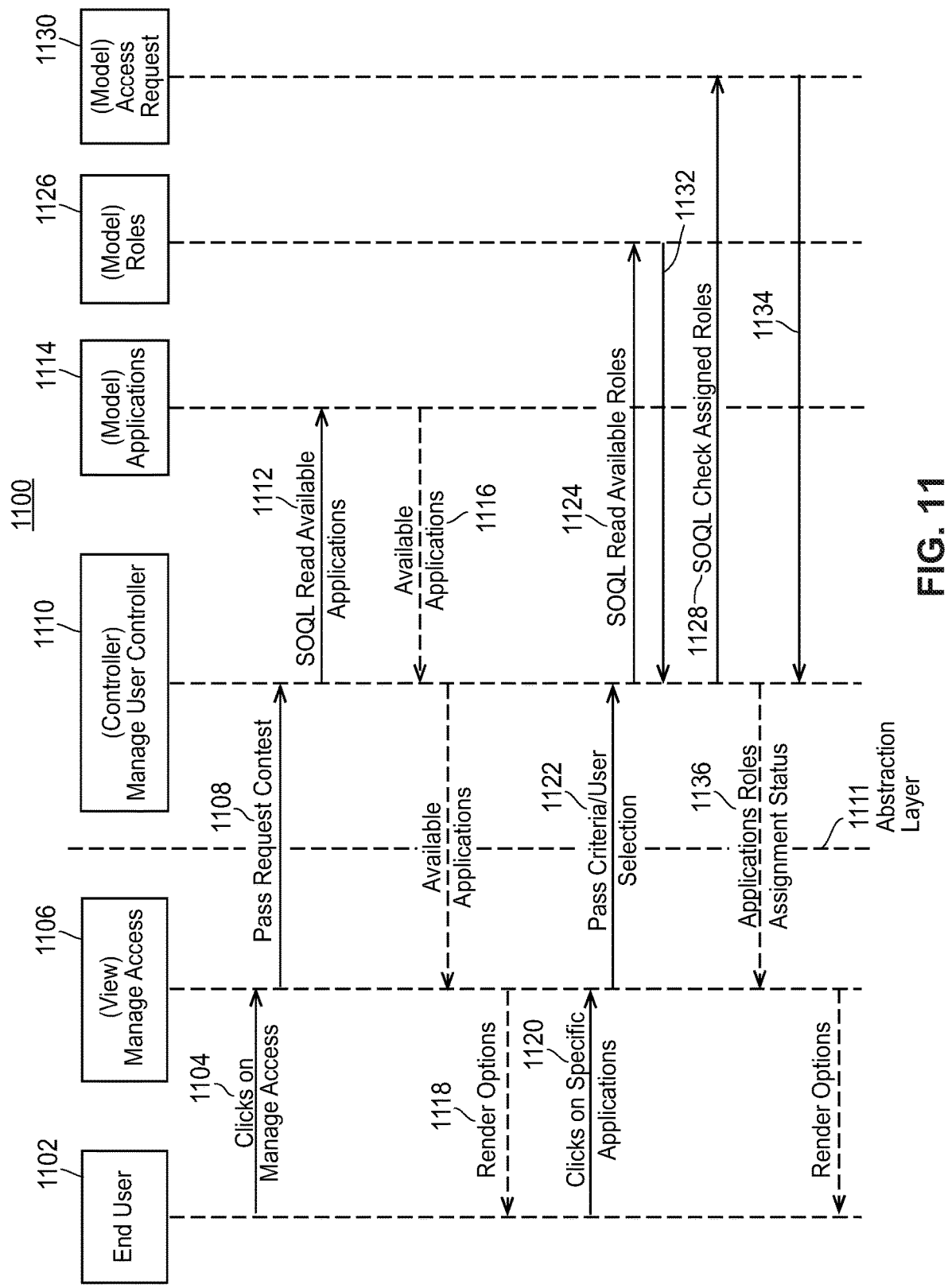
FIG. 11 illustrates an interaction workflow indicating the processes involved in managing user access to roles, including requests for new roles and removing access to existing roles, in accordance with an example.
Figure 14:
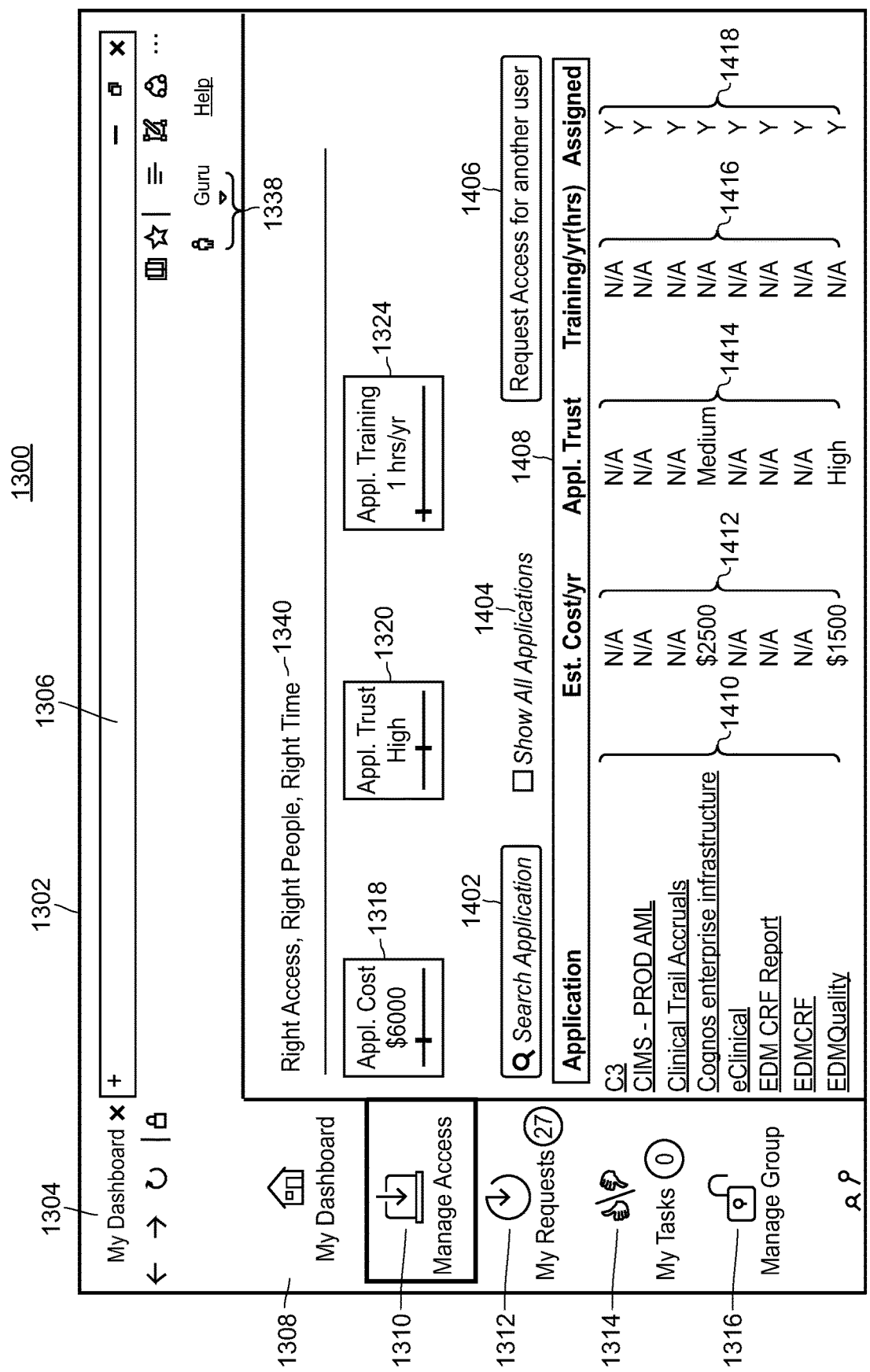
FIG. 14 illustrates an example screenshot for an interaction workflow used in managing user access to roles, including requests for new roles and removing access to existing roles, in accordance with an example.

FIG. 11 illustrates a workflow 1100 indicating the processes involved in managing user access to roles, including requests for new roles and removing access to existing roles. An example screenshot 1400 that showcases the functionality of the workflow 1100 is shown in FIG. 14, described below. A user 1102 accesses the system and selects, at 1104, to manage access, provided at display of a portal 1106. In a similar manner to that described above, a request 1108 is sent to manager user access downstream control program 1110, using assembly lines in an abstraction layer 1111. A request 1112 to read available applications for access is sent to a downstream application listing program 1114, which returns the listing of available applications 1116 to the control program 1110, which then sends the listing back to the portal 1106 and for rending options 1118 for selection by the user 1102. The available applications 1116 may be displayed according to the example screenshot 1400 depicted in FIG. 14. The user 1102 selecting on one of the render options, at 1120, has the selected option 1122 sent from the portal 1106 to the control program 1110, which then checks the roles available at a downstream roles control program 1126 through a request 1124. The program 1126 identifies the available roles. The program 1110 also sends a request 1128 to a downstream access request control program 1130, which checks what roles have been assigned to the user 1102 already. Both control programs 1126 and 1130 send responses 1132 and 1134, respectively. In response, the manage user control program 1110 determines if the user's selected access is allowable, either from the assigned roles identified from the program 1130 or from the available roles identified by the program 1126. For instances, when the selected access is part of an available role, but not an assigned role, the program 1110 may reject the request and send that in response 1136 to be displayed to the user 1102. Or in other instances, the program 1110 may grant the selected access by sending itself.

Figure 12:
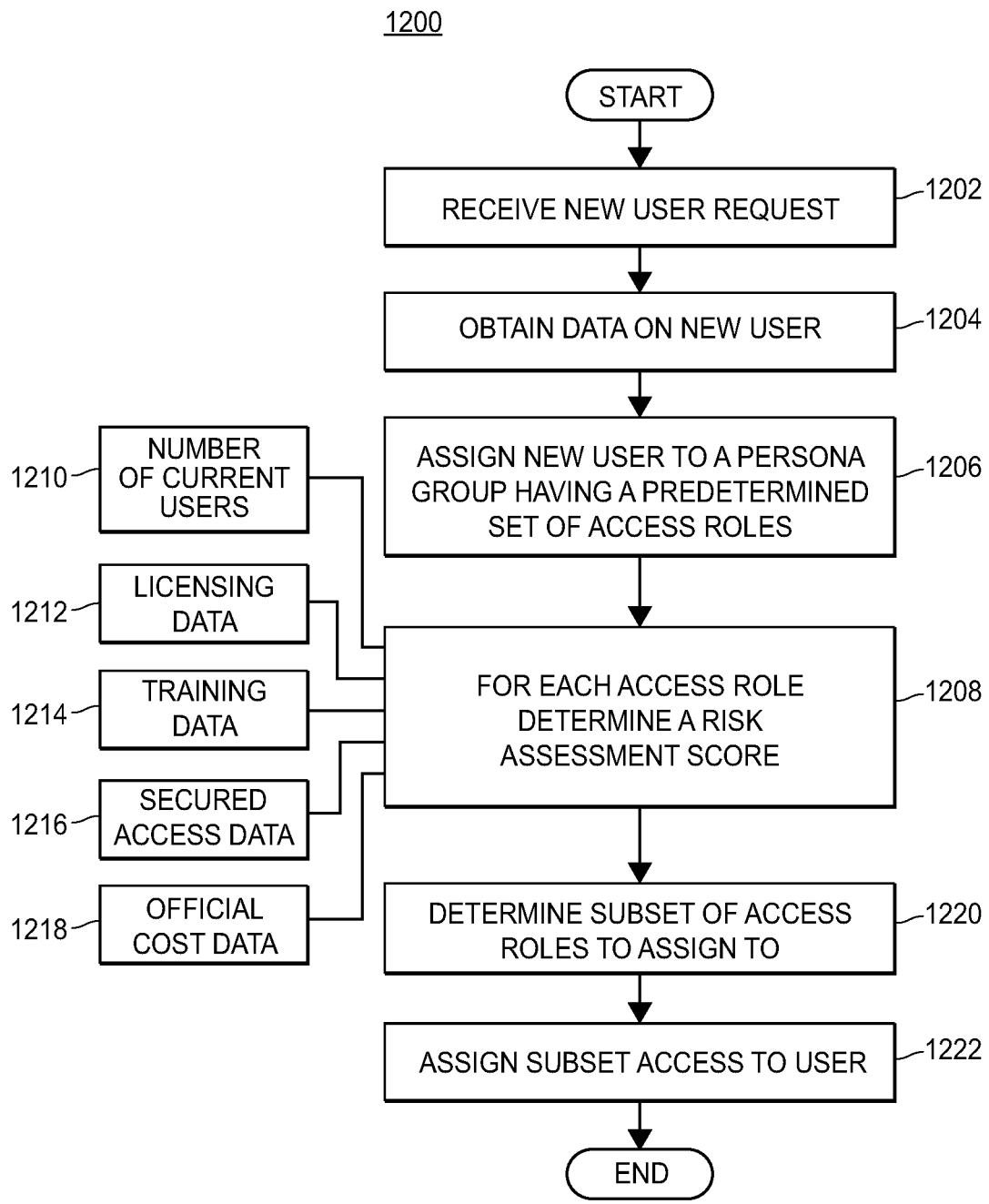
FIG. 12 illustrates a flow diagram of a process of risk assessment in response to an onboarding request, in accordance with an example.

FIG. 12 illustrates a flow diagram of a process of risk assessment 1200 performed by an access system, for example the system depicted in FIG. 3, in response to a request to onboard a new user and used to determine whether to grant access rights to a user. Initially, a request to add a new user is sent from a portal and received at an access control system, at 1202. The access control system obtains data on the new user, at 1204, either from further information received from the portal, whether initially or in response to query from the access control system, or from an external system, such as an external partner computer system of an external organization employing the user. The location for the user information may be identified in the initial new user request at 1202. The access control system includes an abstraction/integration layer that defines assembly lines, e.g., using appropriate API calls, to the various systems used for implementing the onboarding process, whether those systems are internal systems or external systems.

At 1206, the access control system assigns the new user to a persona group, based on the new information. A persona group contains users that have been granted access to the same set of roles, e.g., the same computer applications and/or the same secured data. The assignment at block 1206 is preliminary, in that not all roles for a particular persona group may be assigned to the new user. Factors that are considered in determining whether a user should be preliminarily assigned to a personal group. At block 1206 each access role for the persona group is identified. At 1208, risk assessment data may be collected for each access role. Example risk assessment data includes the number of current users granted access to a role, i.e., a computer program or secured information, stored in a database 1210, licensing data such as user annual licensing access fee for a role stored in database 1212, training information such as the cost of training, the timing of training, etc. stored in a database 1214, secured access data such as data indicating the limitations on the number of users a role may have or on excess network loads from onboarding an additional user stored in a database 1216, and cost data for offloading a user which may be particular relevant for new users in a temporary assignment in their organization, such data being stored in a database 1218. From the risk assessment data, a set of the personal access roles may be determined at 1220 and assigned to the user 1222 by the access control system, which stores the information.

FIG. 13 illustrates an example screenshot 1300 for an interaction workflow for a user access to an access control system, such as the system depicted in FIG. 3, in accordance with an example embodiment. FIG. 13 depicts a window 1302, a navigation pane 1304, a URL toolbar 1306, a set of access panels such as My Dashboard 1308, Manage Access 1310, My Requests 1312, My Tasks 1314, Manage Group 1316, a page title field 1340, and a login/logout functionality 1338. In some embodiments, the system depicted in the screenshot 1300 may include additional access panels, or fewer access panels. The arrangement of all components/fields in relation to each other depicted in the example screenshot 1300 may be explicitly as shown, or may be in a different configuration.

Through the window requests for accessing applications, changing roles, etc. can be managed. All of the components/fields in the screenshot 1300 may be implemented as linkable panels in the window, as drop down menus, as text entry fields, or any other human/interaction input functionality. The screenshot 1300 also includes an application cost field 1318, an application trust level field 1320, and an application training amount field 1324. The application cost may be the cost of adding access to an application for a user. The application trust level may be the risk factor of adding user access for the application (as may be determined according to the process of FIG. 12). The application training may include time spent on average by a user to get and maintain access to the application.

Additionally, the screen layout 1300 includes a set of data fields showing user identifying information categories 1326 such as user name, user id, user email, user manager, and user cost center. The screen layout 1300 also includes a set of data fields showing the user identifying information data 1328 corresponding to the categories 1326. User settings may also be included in the example screen layout 1300 in the user settings field 1330. The user settings field 1330 includes a set homepage setting, a time zone setting, a locale setting, and a language setting. The settings depicted in the user settings values 1332 may be saved as user preferences using functionality in the save preferences field 1334. If a user member has a, or is a, delegated approver that may appear in the delegated approver field 1336.

In an example embodiment, a user would login to the system, and the example screenshot 1300 would display to the user after the system, such as the access control system discussed in FIGS. 1, 2, and 3, verifies the user's credentials. Thus, the example screenshot 1300 may depict a landing page for a successfully logged-in user showing relevant information to the user.

FIG. 14 illustrates an example screenshot 1400 for an interaction workflow indicating the processes involved in managing user access to roles, such as through the use of the system depicted in FIG. 3, including requests for new roles and removing access to existing roles, in accordance with an example embodiment. FIG. 14 depicts a window 1302, a navigation pane 1304, a URL toolbar 1306, a set of access panels such as My Dashboard 1308, Manage Access 1310, My Requests 1312, My Tasks 1314, Manage Group 1316, a page title field 1340, and a login/logout functionality 1338. In some embodiments, the window includes additional access panels, or fewer access panels. All of the components/fields in the screenshot 1400 may be implemented as linkable panels in the window, as drop down menus, as text entry fields, or any other human/interaction input functionality. The arrangement of all components/fields in relation to each other depicted in the example screenshot 1400 may be explicitly as shown, or may be in a different configuration.

The screenshot 1400 also includes an application search field 1402, a show all applications toggle 1404, and a request access for another user button 1406. The screenshot 1400 also includes a set of application data categories showing application name, estimated cost per year, application trust level, an amount of training per year in hours, and whether the application has been assigned to a user. The screenshot 1400 also includes a set of data fields showing a list of available applications 1410, a set of estimated cost per year for the list of available applications 1412, a set of application trust levels for the list of available applications 1414, an amount of training per year in hours for the list of available applications 1416, and whether the application has been assigned to a user for the list of available applications 1418.

In an example embodiment, a logged-in user would access the manage access panel, and the example screenshot 1400 would display to the user available applications for the user to request training on. Thus, the example screenshot 1400 may depict a landing page for a successfully logged-in user who has clicked on the manage access panel showing relevant information to the user.

FIG. 15 illustrates an example system 1500 for performing the functions of any of the architectures disclosed herein, as well as any of the interaction workflows for the embodiments discussed herein, as well as any additional necessary or optional processes. FIG. 15 may depict a server arrangement having backend servers, third party partners, and devices deployed for user's use all connected together via the network 106. More particularly, FIG. 15 depicts a computing system 1502 that may have a controller 1504 operatively connected to a data storage device 1514 via a link, which may be a local and/or a remote link. The system 1502 may also be connected to a device 1516 via a network 106. It should be noted that, while not shown, additional data storage devices or entities may be linked to the controller 1504 in a known manner. For example, separate, additional databases and/or data storage devices (not shown) may be used for various types of information relevant to staff, applications, external partners, training for applications, teams, or any of the other information described herein. Additional databases or data storage devices (not shown) may be communicatively connected to the computing system 1502 via the network 106, such as databases maintained by third parties such as the external partners 130 or 132 depicted in FIG. 1.

The controller 1504 may include one or more applications 1510, one or more processors 1506 (which may be called a microcontroller or a microprocessor), one or more random-access memories (RAMs) 1508, and an input/output (I/O) circuit 1512, all of which may be interconnected via an address/data bus. It should be appreciated that although only one microprocessor 1506 is shown, the controller 1504 may include multiple microprocessors 1506. Similarly, the memory of the controller 1504 may include multiple RAMs 1508 and multiple applications 1510. Although the I/O circuit 1512 is shown as a single block, it should be appreciated that the I/O circuit 1512 may include a number of different types of I/O circuits. The RAM 1508 and applications 1510 may be stored on semiconductor memories, magnetically readable memories, optically readable memories, or biologically readable memories, for example. Generally speaking, the RAM 1508 and/or the applications 1510 may respectively be stored on one or more non-transitory, computer-readable storage media. The controller 1504 may also be operatively connected to the network 106 via a link 1518.

The computing system 1502 may further include the applications 1510. In an embodiment, the applications 1510 comprise one or more software applications or sets of computer-executable instructions that are stored in memory and executable by the processor 1506. In an embodiment, at least some of the applications 1510 may be implemented at least partially in firmware and/or in hardware at the computing system 1502.

The various modules or software applications 1510 may be executed on the same computer processor 1506 or on different computer processors. Further, while the various applications 1510 are depicted as separate applications, two or more of the applications 1510 may be integrated as an integral application, if desired. In some embodiments, at least one of the applications 1510 may be implemented in conjunction with another application (not shown) that is stored and executed at the device 1516, such as an application stored by an external partner 130 or 132. The applications 1510 represent computer instructions (subroutines, etc.) to perform functions described in the various embodiments herein.

The data storage device 1514 may be particularly configured to store various types of data related to and used for techniques for cloud based computing systems and, more particularly, to techniques for providing centralized user access to network connected computing systems. More particularly, data stored at the data storage 1514 may be used to provide a network-based, automated user access provisioning system servicing multiple users, across multiple locations, and controlling user access to computer programs and information across dedicated computer systems. Such as systems and methods used for identity management, access and resource management, onboarding new users to a system, and offboarding existing users. Additionally, data stored at the data storage 1514 may be data by which users can keep track of job requirements, for example training requirements, which correlate to a user's access to resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computer implemented method for handling access commands originating from at least one source application utilizing a first format, directed to at least one destination application utilizing a second format, the method comprising:
    receiving, at a processor, an access command from a user using the at least one source application, wherein the access command includes a data payload structured according to the first format, and the at least one destination application for the data payload;
    determining, at the processor, a type for the access command based on the data payload;
    generating, at the processor, an action based on the type for the access command and the data payload;
    translating, at the processor, the data payload into a common format, wherein the common format is determined using the first format and the second format, and comprises identifying information on the user, the at least one source application, and the at least one destination application;
    responding, at the processor, to the access command using the action and the translated data payload;
    accessing, at the processor, an application programming interface, wherein the application programming interface comprises a set of protocols; and
    translating, at the processor, the data payload into the common format according to the set of protocols in the application programming interface.

2. The computer implemented method of claim 1, wherein the access command is a request to modify rights, privileges, resources, or combinations thereof, assigned to the user.

3. The computer implemented method of claim 2, wherein the request to modify is a request to on-board the user to the at least one destination application, or a request to off-board the user from the at least one destination application.

4. The computer implemented method of claim 1, wherein the access command is a request to perform a task for the user.

5. The computer implemented method of claim 1, wherein the action comprises modifying, at the processor, rights, privileges, resources, or combinations thereof, to the user.

6. The computer implemented method of claim 1, wherein generating the action further comprises:
    generating, at the processor, a dynamic identity score for the user, wherein the dynamic identity score is based on a set of user characteristics; and
    generating, at the processor, the action based on the dynamic identity score for the user.

7. The computer implemented method of claim 6, wherein the set of user characteristics comprises user identifiable information, user type, and user group membership, or combinations thereof.

8. The computer implemented method of claim 6, wherein if the dynamic identity score is above a threshold level the action is granted, and wherein if the dynamic identity score is below a threshold level the action is denied.

9. The computer implemented method of claim 1, wherein generating the action further comprises:
    generating, at the processor, a dynamic identity score for the user, wherein the dynamic identity score is based on a set of system characteristics; and
    generating, at the processor, the action based on the dynamic identity score for the user.

10. The computer implemented method of claim 9, wherein the set of system characteristics comprises current runtime statistics on a requested computer application, a current number of authorized users for the requested computer application, and a threshold level of users for the requested computer application.

11. The computer implemented method of claim 10, wherein if the dynamic identity score is above a threshold level the action is granted, and wherein if the dynamic identity score is below a threshold level the action is denied.

12. The computer implemented method of claim 1, wherein responding to the access command further comprises:
    transmitting, at the processor, a notification to the user regarding the access command; and
    transmitting, at the processor, the translated data payload and action to the at least one destination application.

13. The computer implemented method of claim 12, wherein transmitting the notification to the user occurs after receiving, at the processor, confirmation of the action being executed by the at least one destination application.

14. The computer implemented method of claim 1, wherein translating the data payload into a common format comprises:

accessing, at the processor, a tailored lookup table, wherein the tailored lookup table comprises a set of application entries and translation values corresponding to the at least one source application and the at least one destination application; and translating, at the processor, the data payload according to the translation values for the at least one source application and the at least one destination application.

15. The computer implemented method of claim 1, wherein responding to the access command using the action comprises:
granting or denying, at the processor, the action based on a set of decisional control rules for the at least one destination application.

16. A non-transitory computer readable medium, which stores non-transitory computer executable instructions for handling access commands originating from at least one source application utilizing a first format, directed to at least one destination application utilizing a second format, the computer executable instructions comprising:
receiving an access command from a user using the at least one source application, wherein the access command includes a data payload structured according to the first format, and the at least one destination application for the data payload;
determining a type for the access command based on the data payload;
generating an action based on the type for the access command and the data payload;
translating the data payload into a common format, wherein the common format is determined using the first format and the second format;
responding to the access command using the action and the translated data payload;
accessing an application programming interface, wherein the application programming interface comprises a set of protocols; and
translating the data payload into the common format according to the set of protocols in the application programming interface.

17. The non-transitory computer readable medium of claim 16, wherein the access command is a request to modify rights, privileges, resources, or combinations thereof, assigned to the user.

18. The non-transitory computer readable medium of claim 17, wherein the request to modify is a request to on-board the user to the at least one destination application, or a request to off-board the user from the at least one destination application.

19. The non-transitory computer readable medium of claim 16, wherein the access command is a request to perform a task for the user.

20. The non-transitory computer readable medium of claim 16, wherein the action comprises modifying, at the processor, rights, privileges, resources, or combinations thereof, to the user.

21. The non-transitory computer readable medium of claim 16, wherein generating the action further comprises:
generating a dynamic identity score for the user, wherein the dynamic identity score is based on a set of user characteristics; and
generating the action based on the dynamic identity score for the user.

22. The non-transitory computer readable medium of claim 16, wherein responding to the access command further comprises:
transmitting a notification to the user via the at least one source application regarding the access command; and
transmitting the translated data payload and action to the at least one destination application.

23. A system for handling access commands originating from at least one source application utilizing a first format, directed to at least one destination application utilizing a second format, the system comprising:
a user interface configured to communicate with a user;
a memory configured to store non-transitory computer executable instructions; and
a processor configured to interface with the memory and the user interface, wherein the processor is configured to execute the non-transitory computer executable instructions to cause the processor to:
receive an access command from the user using the at least one source application, wherein the access command includes a data payload structured according to the first format, and the at least one destination application for the data payload;
determine a type for the access command based on the data payload;
generate an action based on the type for the access command and the data payload;
translate the data payload into a common format, wherein the common format is determined using the first format and the second format;
respond to the access command using the action and the translated payload;
access, at the processor, an application programming interface, wherein the application programming interface comprises a set of protocols; and
translate, at the processor, the data payload into the common format according to the set of protocols in the application programming interface.

24. The system of claim 23, wherein the access command is a request to modify rights, privileges, resources, or combinations thereof, assigned to the user.

25. The system of claim 24, wherein the request to modify is a request to on-board the user to the at least one destination application, or a request to off-board the user from the at least one destination application.

26. The system of claim 23, wherein the action comprises granting, or revoking, at the processor, rights, privileges, resources, or combinations thereof, to the user.

27. The system of claim 23, wherein to generate the action, the processor is further configured to:
generate a dynamic identity score for the user, wherein the dynamic identity score is based on a set of user characteristics; and
generate the action based on the dynamic identity score for the user.

28. The system of claim 23, wherein to respond to the access command, the processor is further configured to:
transmit a notification to the user regarding the access command; and
transmit the translated data payload and action to the at least one destination application.

* * * * *